US006867537B2

(12) United States Patent
Sato et al.

(10) Patent No.: US 6,867,537 B2
(45) Date of Patent: Mar. 15, 2005

(54) IMAGE-FORMING APPARATUS HAVING VENT TUBE AND GETTER

(75) Inventors: Yasue Sato, Kawasaki (JP); Shinichi Kawate, Sagamihara (JP); Kazuyuki Ueda, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/361,963

(22) Filed: Jul. 28, 1999

(65) Prior Publication Data

US 2002/0030435 A1 Mar. 14, 2002

Related U.S. Application Data

(62) Division of application No. 08/479,372, filed on Jun. 7, 1995, now Pat. No. 5,952,775.

(30) Foreign Application Priority Data

Jun. 9, 1994 (JP) .............................................. 6-127447
May 30, 1995 (JP) .............................................. 7-132027

(51) Int. Cl.[7] ............................. G01J 1/62; G01J 1/304
(52) U.S. Cl. ........................ 313/495; 313/309; 313/553
(58) Field of Search ................................ 313/309, 310, 313/311, 422, 495, 496, 497, 233, 481, 292, 553, 554, 556, 561; 315/169.3; 428/917, 960

(56) References Cited

U.S. PATENT DOCUMENTS

| | | | | |
|---|---|---|---|---|
| 3,580,654 A | | 5/1971 | Kupsky | |
| 3,914,000 A | | 10/1975 | Beckerman et al. | |
| 4,841,194 A | | 6/1989 | Kishino et al. | 313/496 |
| 5,072,311 A | | 12/1991 | Hiramatsu et al. | 358/487 |
| 5,519,284 A | * | 5/1996 | Pepi | 313/495 |
| 5,525,861 A | * | 6/1996 | Banno et al. | 313/495 |

(List continued on next page.)

FOREIGN PATENT DOCUMENTS

| | | |
|---|---|---|
| EP | 0 451 362 | 10/1991 |
| EP | 0 476 975 | 3/1992 |
| EP | 0 631 295 | 12/1994 |
| JP | 57-136747 | 9/1982 |
| JP | 62-178442 | 11/1987 |
| JP | 64-31332 | 2/1989 |
| JP | 2-299136 | 12/1990 |
| JP | 5-205669 | 8/1993 |
| WO | WO 88010/98 | 2/1988 |

OTHER PUBLICATIONS

G. Dittmer, "Electrical Conduction and Electron Emission of Discontinuous Thin Films", Thin Solid Films, No. 9, pp. 317–328 (1972).

(List continued on next page.)

*Primary Examiner*—Ashok Patel
*Assistant Examiner*—K. Guharay
(74) *Attorney, Agent, or Firm*—Fitzpatrick, Cella, Harper & Scinto

(57) ABSTRACT

An image-forming apparatus has a rear plate including electron-emitting devices formed thereon, a face plate including a fluorescent film formed thereon and being disposed to face the rear plate, flat plate spacers disposed between the rear plate and the face plate, and an outer frame surrounding peripheral edges of the rear plate and the face plate. Electrons emitted from the electron-emitting devices are irradiated to the fluorescent film to thereby display an image under condition where an inner space of a container constructed by the rear plate, the face plate and the outer frame is evacuated through a vent tube into a depressurized state. The vent tube is attached to a side of the outer frame that is positioned across an imaginary extension of the flat-plate spacer in the longitudinal direction thereof, or to the face plate or the rear plate in the vicinity of that side of the outer frame. With such arrangements, evacuation conductance is increased to reduce an evacuation time, and a higher vacuum level is achieved in the container so that an image can be stably displayed for a long time.

5 Claims, 19 Drawing Sheets

U.S. PATENT DOCUMENTS

| | | | | | |
|---|---|---|---|---|---|
| 5,537,001 | A | | 7/1996 | Clerc | 313/634 |
| 5,663,608 | A | * | 9/1997 | Jones et al. | 313/309 |
| 5,760,538 | A | * | 6/1998 | Mitsutake et al. | 313/258 |
| 5,936,342 | A | * | 8/1999 | Ono et al. | 313/495 |
| 5,952,775 | A | * | 9/1999 | Sato et al. | 313/422 |
| 5,977,706 | A | * | 11/1999 | Cho et al. | 313/553 |
| 6,100,627 | A | * | 8/2000 | Carretti et al. | 313/309 |
| 6,153,973 | A | * | 11/2000 | Shibata et al. | 313/258 |
| 6,160,347 | A | * | 12/2000 | Iwasaki et al. | 313/346 R |
| 6,278,233 | B1 | * | 8/2001 | Sanou et al. | 313/292 |
| 6,472,819 | B2 | * | 10/2002 | Carretti et al. | 313/562 |

OTHER PUBLICATIONS

W.P. Dyke, et al., "Field Emission,", Advances in Electronics and Electron Physics, vol. Viii, pp. 89–185 (1956).

M. Hartwell, et al., "Strong Electon Emission from Patterned Tin–Indium Oxide Thin Film", International Electron Devices Meeting, pp. 519–521 (1975).

M.I. Elinson, et al., "The Emission of Hot Electrons and the Field Emission of Electrons From Tin Oxide", Radio Engineering and Electronic Physics, No. 7, pp. 1290–1296 (Jul. 1965).

H. Araki, et al., "Electroforming and Electron Emission of Carbon Thin Films", Journal of the Vacuum Society of Japan, vol. 26, No. 1, pp. 22–29 (Jan. 26, 1983).

C.A. Spindt, et al., "Physical Properties of Thin–Film Emission Cathodes with Molybdenum Cones", Journal of Applied Physics, vol. 47, No. 12, pp. 5248–5263 (Dec. 1976).

* cited by examiner

IMAGE-FORMING APPARATUS HAVING VENT TUBE AND GETTER

This application is a division of application Ser. No. 08/479,372 filed Jun. 7, 1995, now U.S. Pat. No. 5,952,775.

BACKGROUND OF THE INVENTION

1. Field of the Invention

The present invention relates to a flat type image-forming apparatus using electron-emitting devices, and a manufacture method of the image-forming apparatus.

2. Related Background Art

Recently, light and thin displays, i.e., the so-called flat displays, have received widespread attention as an image-forming apparatus to be used in place of large and heavy cathode-ray tubes. Liquid crystal displays have been intensively researched and developed as typical flat displays, but still have problems that an image is dark and an angle of the view field is narrow. Emission type flat displays in which electron beams emitted from electron-emitting devices are irradiated to fluorescent substances to generate fluorescence, thereby forming an image, are also known as ones expected to be substituted for liquid crystal displays. The emission type flat displays using the electron-emitting devices provide a brighter image and a wider angle of the view field than the liquid crystal displays. Demand for the emission type flat displays is increasing because they are also adaptable for achievement of larger screen size and finer resolution.

There are known two main types of electron-emitting devices; i.e., a hot cathode device and a cold cathode device. Cold cathode devices include, for example, electron-emitting devices of field emission type (hereinafter abbreviated to FE), of metal/insulating layer/metal type (hereinafter abbreviated to MIM), and of surface conduction type. Examples of FE electron-emitting devices are described in, e.g., W. P. Dyke & W. W. Doran, "Field Emission", Advance in Electron Physics, 8, 89 (1956) and C. A. Spindt, "Physical properties of thin-film field emission cathodes with molybdenum cones", J. Appl. Phys., 47, 5248 (1976).

One example of MIM electron-emitting devices is described in, e.g., C. A. Mead, "Operation of Tunnel-Emission Devices", J. Appl. Phys., 32, 646 (1961).

One example of surface conduction electron-emitting devices is described in, e.g., M. I. Elinson, Radio Eng. and Electronic Phys., 7, 1290, (1965).

In a surface conduction electron-emitting device, when a thin film of a small area is formed on a base plate and a current is supplied to flow parallel to the film surface, electrons are emitted therefrom. As to such a surface conduction electron-emitting device, there have been reported, for example, one using a thin film of $SnO_2$ by Elinson cited above, one using an Au thin film [G. Dittmer: Thin Solid Films, 9, 317 (1972)], one using a thin film of $In_2O_3/SnO_2$ [M. Hartwell and C. G. Fonstad: IEEE Trans. ED Conf., 519 (1975)], and one using a carbon thin film [Hisashi Araki et al.: Vacuum, Vol. 26, No. 1, 22 (1983)].

As a typical configuration of those surface conduction electron-emitting devices, FIG. 22 schematically shows the device configuration proposed by M. Hartwell, et al. in the above-cited paper. In FIG. 22, denoted by reference numeral 1 is a base plate and 33 is a conductive thin film made of a metal oxide formed by sputtering into an H-shaped pattern. The conductive thin film 33 is subjected to an energizing process called forming by energization (described later) to form an electron-emitting region 34. Incidentally, the spacing L between device electrodes 31, 32 is set to 0.5–1 mm and the width W' of the conductive thin film 33 is set to 0.1 mm.

In those surface conduction electron-emitting devices, it has heretofore been customary that, before starting the emission of electrons, the conductive thin film 33 is subjected to an energizing process called forming by energization to form the electron-emitting region 34. The term "forming by energization" means a process of applying a DC voltage being constant or rising very slowly across the conductive thin film 33 to locally destroy, deform or denature it to thereby form the electron-emitting region 34 which has been transformed into an electrically high-resistant state. In the electron-emitting region 34, a crack is produced in part of the conductive thin film 33 and electrons are emitted from the vicinity of the crack. Thus, the surface conduction electron-emitting device after the forming by energization emits electrons from the electron-emitting region 34 when an appropriate voltage is applied to the conductive thin film 33 so that a current flows through the device.

The surface conduction electron-emitting device is simple in structure and easy to manufacture, and hence has an advantage that a number of devices can be formed into an array having a large area. Therefore, the application of the surface conduction electron-emitting device to charged beam sources, displays and so on have been studied in view of such advantageous features. As one example of applications in which a number of the surface conduction electron-emitting devices are formed into an array, there is proposed an electron source that, as described later in detail, the surface conduction electron-emitting devices are arrayed in parallel, i.e., in the so-called ladder pattern, and opposite ends of the individual devices are interconnected by two wirings (called also common wirings) to form one row, followed by forming this row in a large number (see, e.g., Japanese Patent Application Laid-Open No. 64-31332).

The applicant has previously proposed a flat type image forming apparatus wherein a base plate (hereinafter referred to also as a rear plate) including electron-emitting devices formed thereon and a base plate (hereinafter referred to also as a face plate) including a fluorescent film formed thereon are disposed to face each other, a space defined between both the base plates is evacuated into a depressurized state (or a vacuum state), and electron beams emitted from the electron-emitting devices are irradiated to the fluorescent film to form an image (see, Japanese Patent Application Laid-Open No. 2-299136).

FIG. 23 schematically shows a section of the above flat type image forming apparatus using the electron-emitting devices. In FIG. 23, the apparatus comprises a rear plate 1, electron-emitting devices 54, and a pressure bearing member 3 endurable against the atmospheric pressure. Denoted by 4 is a face plate on the undersurface of which a fluorescent film 5 and a metal back 6 are formed. An outer frame 8 is connected to the face plate 4 and the rear plate 1 through frit glass 7 in a sealed manner to construct an envelope (vacuum container). An inner space in the envelope is evacuated through a vent tube (not shown) to establish a depressurized state (or a vacuum state).

However, it has been found from studies made by the inventors that there is still room for improvement of the above image forming apparatus in points below. The presence of the pressure bearing member endurable against the atmospheric pressure in the vacuum envelope reduces evacuation conductance. Therefore, a relatively long time is required to evacuate the inner space of the envelope. Also, when the envelope is evacuated in a relatively short time, there arises a fear that the inner space of the envelope may not be sufficiently depressurized and a finally reached vacuum level may be relatively low. Accordingly, the operation of evacuating the envelope takes a larger percentage in the production cost. It is thus concluded that reducing the time required for evacuating the envelope greatly contributes to cut down the cost. Also, this effect is expected to become more remarkable in an image-forming apparatus having a larger display screen size.

SUMMARY OF THE INVENTION

An object of the present invention is to provide an image-forming apparatus and a manufacture method of the image-forming apparatus which are able to solve the above-explained technical problems in the prior art.

Another object of the present invention is to provide an image-forming apparatus and a manufacture method of the image-forming apparatus by which evacuation conductance can be increased to reduce an evacuation time.

Still another object of the present invention is to provide an image-forming apparatus and a manufacture method of the image-forming apparatus by which a higher vacuum level can be achieved in an envelope (vacuum container) to reduce residual gas left in the envelope, enabling an image to be stably displayed for a long term.

To achieve the above objects, the image-forming apparatus of the present invention is arranged as follows.

The image-forming apparatus according to the present invention comprises a rear plate including electron-emitting devices formed thereon, a face plate including a fluorescent film formed thereon and being disposed to face the rear plate, a spacer in the form of a flat plate disposed between the rear plate and the face plate, and an outer frame surrounding peripheral edges of the rear plate and the face plate. Electrons emitted from the electron-emitting devices are irradiated to the fluorescent film to thereby display an image under condition where an inner space of a container constructed by the rear plate, and the face plate and the outer frame is evacuated through a vent tube into a depressurized state. The vent tube is attached to a side of the outer frame that is positioned across an imaginary extension of the flat-plate spacer in the longitudinal direction thereof, or to the face plate or the rear plate in the vicinity of that side of the outer frame.

The present invention also involves a manufacture method of the image-forming apparatus.

The manufacture method according to the present invention is a method for manufacturing an image-forming apparatus comprising a rear plate including electron-emitting devices formed thereon, a face plate including a fluorescent film formed thereon and being disposed to face the rear plate, a spacer in the form of a flat plate disposed between the rear plate and the face plate, and an outer frame surrounding peripheral edges of the rear plate and the face plate. Electrons emitted from the electron-emitting devices are irradiated to the fluorescent film to thereby display an image under condition where an inner space of a container constructed by the rear plate, and the face plate and the outer frame is evacuated through a vent tube into a depressurized state. The method comprises providing a vent tube attached to a side of the outer frame that is positioned across an imaginary extension of the flat-plate spacer in the longitudinal direction thereof, or to the face plate or the rear plate in the vicinity of that side of the outer frame, and evacuating the inner space of the container through the vent tube.

With the present invention, the above-explained technical problems in the prior art can be solved and the foregoing objects can be achieved. With the manufacture method of the image-forming apparatus of the present invention, since the vent tube is disposed in a specific position, evacuation conductance can be increased to reduce an evacuation time. In addition, a higher vacuum level can be achieved in the container (envelope).

With the image-forming apparatus of the present invention, residual gas left in the container (envelope) space can be reduced to a very small amount and, therefore, stable image display can be continued for a long term.

DETAILED DESCRIPTION OF THE PREFERRED EMBODIMENTS

Figure 1:
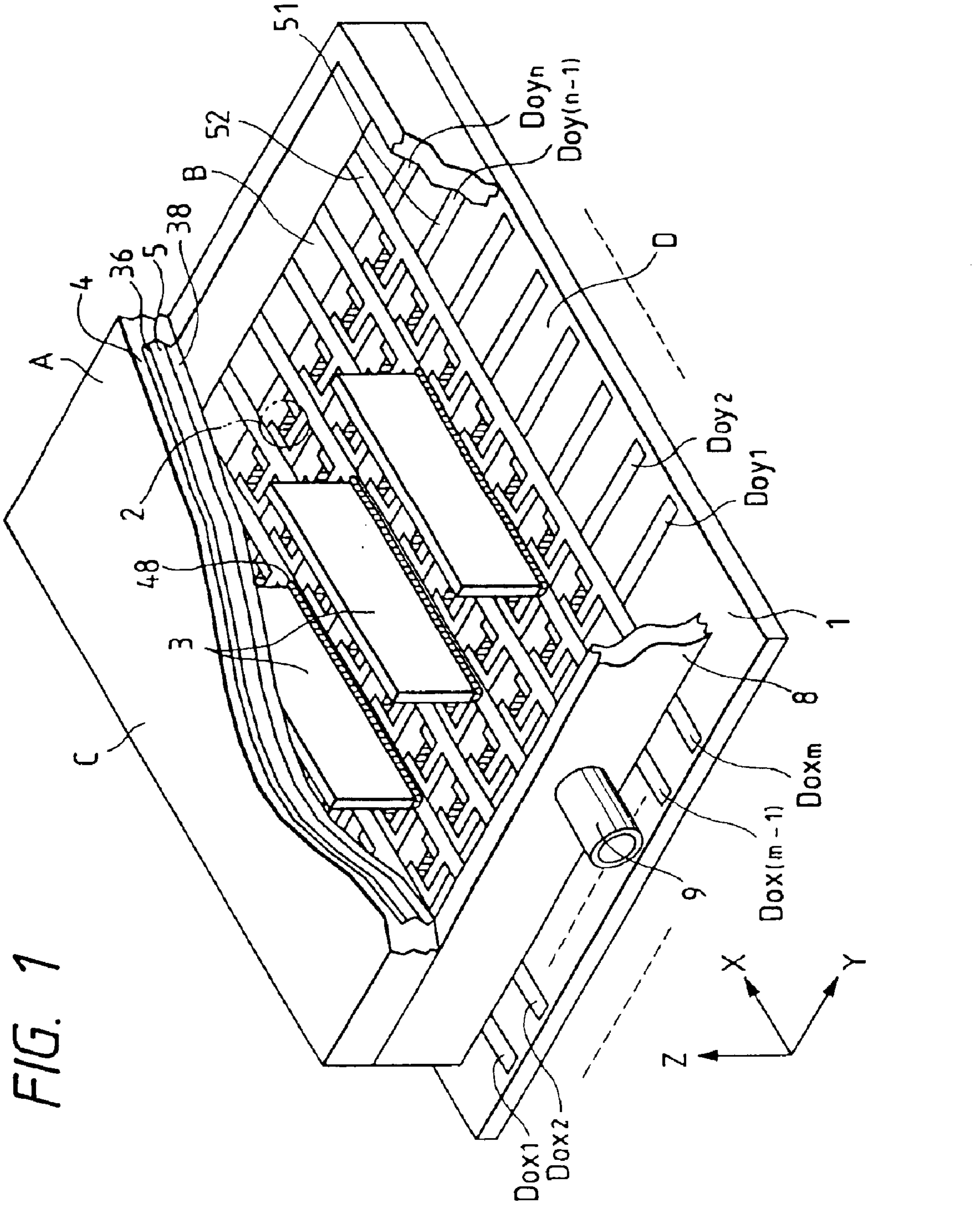
FIG. 1 is a schematic perspective view, partly broken away, showing one example of the image-forming apparatus of the present invention.

An image-forming apparatus and a manufacture method of the image-forming apparatus according to the present invention are basically arranged as set forth above.

One example of the image-forming apparatus of the present invention will be described below with reference to FIG. 1, which schematically shows the image-forming apparatus of the present invention. In the image-forming apparatus of FIG. 1, a rear plate 1 including electron-emitting devices 2 formed thereon and a face plate 4 including a fluorescent film 5 formed thereon are disposed to face each other, and an outer frame 8 is disposed to surround the face plate 4 and the rear plate 1 along their peripheral edges. A plurality of spacers 3 in the form of flat plates are disposed between the face plate 4 and the rear plate 1, the spacers 3 being bonded to the rear plate 1 by an adhesive 48. In use of the image-forming apparatus of the present invention, an inner space of an envelope (vacuum container) constructed by the face plate 4, the rear plate 1 and the outer frame 8 is evacuated into a depressurized state. The spacers 3 are, therefore, provided to keep the structure of the envelope endurable against the atmospheric pressure. A vent tube 9 through which an inner space of the envelope is evacuated is attached to a side of the outer frame 8 that is positioned across imaginary extensions of the flat-plate spacers 3 in the longitudinal direction thereof. Denoted by 51, 52 are wirings for interconnecting the electron-emitting devices arrayed in a matrix pattern. A black film 36 formed of a black matrix or the like and a metal back 38 are provided, if required, as shown. While the vent tube 9 is attached to the side of the outer frame 8 that is positioned across the imaginary extensions of the flat-plate spacers 3 in the longitudinal direction thereof, as explained above, in this embodiment, the attachment position of the vent tube 9 is not limited to the outer frame. By way of example, the vent tube 9 may be attached to the face plate 4 at a position A or the rear plate 1 at a position B. These positions A and B belong to areas of the face plate and the rear plate, respectively, located in the vicinity of the side of the outer frame 8 that is positioned across the imaginary extensions of the flat-plate spacers 3 in the longitudinal direction thereof. In this case, however, it is required that the areas of the face plate and the rear plate which locate in the vicinity of the side of the outer frame that is positioned across the imaginary extensions of the flat-plate spacers in the longitudinal direction thereof be selected so as not to affect a pixel portion in which an image is formed.

With the present invention, since the vent tube 9 is disposed in the specific position described above, evacuation conductance can be increased to shorten an evacuation time, achieve a higher vacuum level, and hence reduce an amount of residual gas left in the envelope. If the vent tube is attached to a position C or D in FIG. 1, the evacuation conductance would not be so high as that resulted by attaching the vent tube to the position A or B. Therefore, the present invention does not involve such an arrangement that the vent tube is attached to the position C or D. In the present invention, the number of the vent tubes is not limited to one, but may be plural. Further, the vent tube and the flat-plate spacers can be positioned in various combinations as described later.

In the image-forming apparatus shown in FIG. 1, after evacuating the inner space of the envelope (vacuum container) constructed by the face plate 4, the rear plate 1 and the outer frame 8 through the vent tube 9, the vent tube 9 is sealed off to maintain the inner space at a vacuum level on the order of $10^{-5}$ torr to $10^{-8}$ torr. Under this condition, voltages are selectively applied through terminals Dox1 to Doxm and Doy1 to Doyn to the electron-emitting devices 2, causing electrons to be emitted from the electron-emitting devices 2. The emitted electrons are irradiated to the fluorescent film 5 so that fluorescence is generated from the film 5 to form an image.

Not only surface conduction electron-emitting devices, but also hot cathode devices, FE electron-emitting devices and others can be used as the electron-emitting devices in the present invention. While the following description will be made mainly in connection with the case of using surface conduction electron-emitting devices, the present invention is not limited to the image-forming apparatus using surface conduction electron-emitting devices.

Figure 13A:
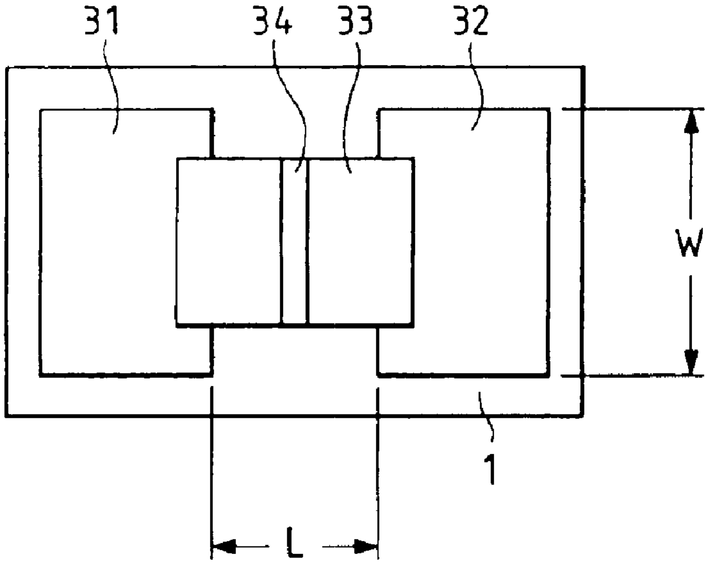
FIGS. 13A and 13B are schematic plan and sectional views, respectively, of a planar type surface conduction electron-emitting device which can be used in the present invention.
Figure 13B:
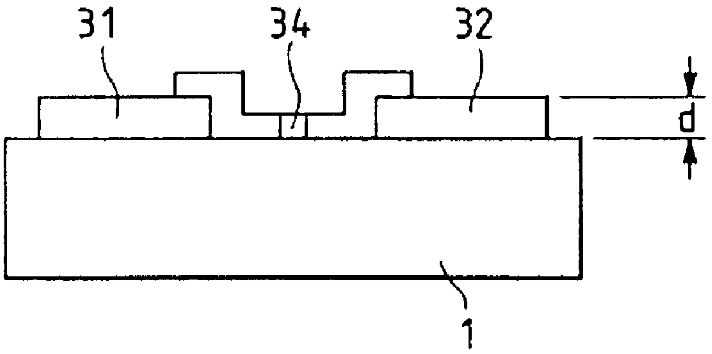

FIGS. 13A and 13B are a schematic plan and sectional view, respectively, of a surface conduction electron-emitting device which can be used in the present invention.

In FIGS. 13A and 13B, denoted by 1 is a base plate, 31 and 32 are device electrodes, 33 is a conductive thin film, and 34 is an electron-emitting region.

The base plate 1 may be any of various glasses such as quartz glass, glass containing impurities such as Na in a reduced content, soda lime glass, and glass having $SiO_2$ laminated thereon by sputtering, or ceramics such as alumina.

The device electrodes 31, 32 opposed to each other can be made of any of the usual conductive materials. By way of example, a material for the device electrodes may be selected from metals such as Ni, Cr, Au, Mo, W, Pt, Ti, Al, Cu and Pd or alloys thereof, printed conductors comprising metals such as Pd, As, Ag, Au, $RuO_2$ and Pd-Ag or oxides thereof, glass and so on, transparent conductors such as $In_2O_3$—$SnO_2$, and semiconductors such as polysilicon.

The spacing L between the device electrodes, the length W of each device electrode, and the shape of the conductive thin film 33 are designed in view of the form of application and other conditions. The spacing L between the device electrodes is preferably in the range of several thousands angstroms to several hundreds microns, more preferably in the range of 1 $\mu$m to 100 $\mu$m, taking into account the voltage applied to between the device electrodes. The length W of each of the device electrode 31, 32 is in the range of several microns to several hundreds of microns. The thickness d of each device electrode is in the range of 100 Å to 1 $\mu$m.

In addition to the structure shown in FIGS. 13A and 13B, the surface conduction electron-emitting device may also be obtained by laminating one device electrode 31, the conductive thin film 33, and the other device electrode 32 on the base plate 1 successively.

In order to provide good electron-emitting characteristics, the conductive thin film 33 is preferably formed of a fine particle film comprising fine particles. The thickness of the conductive thin film 33 is appropriately set in consideration of step coverage to the device electrodes 31, 32, a resistance value between the device electrodes 31, 32, conditions of the forming process (described later), and so on. In general, the thin film is preferably in the range of several angstroms to several thousands angstroms, more preferably in the range of 10 Å to 500 Å. The conductive thin film 33 has a resistance value expressed by Rs in the range of $1\times10^2$ to $1\times10^7\Omega$. Incidentally, Rs is a value which appears when the resistance R of a thin film having a thickness t, a width w and a length l is defined by $R=Rs(l/w)$, and it is represented by $Rs=\rho/t$ where the resistivity of a thin film material is $\rho$. While the forming process will be described as being carried out by energization in this specification, it is not limited to the energization process, but may be carried out by any suitable method which can cause a crack in the film to develop a high-resistance state.

A material used to form the conductive thin film 33 can be appropriately selected from, for example, metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge, and carbon.

The term "fine particle film" used herein means a film comprising a number of fine particles aggregated together and having a microstructure that individual fine particles are dispersed away from each other, or adjacent to each other, or overlapped with each other (including a structure where some fine particles are aggregated and dispersed in island states over the entire film). The size of the fine particles is in the range of several angstroms to one micron, more preferably 10 Å to 200 Å.

The electron-emitting portion 34 is formed by a high-resistance crack developed in part of the conductive thin film 33, and depends on the thickness, properties and material of the conductive thin film 33, the manner of the forming process by energization, and so on. Conductive fine particles having a size not larger than 1000 Å may be contained in the electron-emitting region 34. The conductive fine particles contain part or all of elements making up a material of the conductive thin film 33. The electron-emitting region 34 and the conductive thin film 33 in the vicinity thereof may contain carbon or carbon compounds in some cases.

Figure 14:
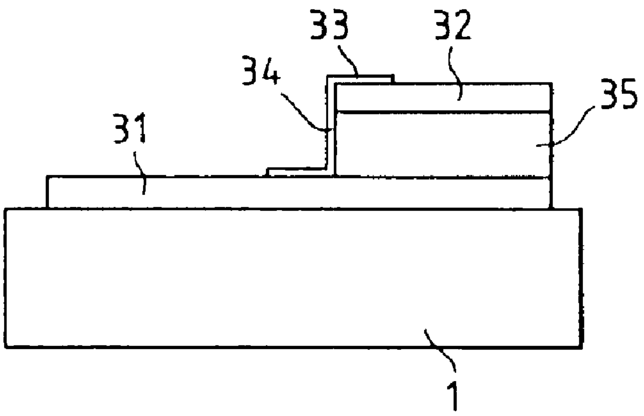
FIG. 14 is a schematic view showing one example of a step type surface conduction electron-emitting device which can be used in the present invention.

FIG. 14 schematically shows one example of a step type surface conduction electron-emitting device which can be used in the image-forming apparatus of the present invention.

In FIG. 14, the same components as those in FIGS. 13A and 13B are denoted by the same reference numerals. Denoted by 35 is a step-forming section. A base plate 1, device electrodes 31 and 32, a conductive thin film 33, and an electron-emitting region 34 can be made of similar materials as used in the flat-type surface conduction electron-emitting devices explained above. The step forming section 35 is formed of, e.g., an electrically insulating material such as $SiO_2$ by any suitable process of vacuum evaporation, printing, sputtering or the like. The thickness of the step forming section 35 may be in the range of several thousands angstroms to several microns corresponding to the spacing L between the device electrodes in the flat-type surface conduction electron-emitting devices explained above. While the thickness of a film used to form the step-forming section 35 is set in consideration of a manufacture process of the step forming section 35 and the voltage applied to between the device electrodes, it is preferably in the range of several hundreds angstroms to several microns.

The conductive thin film 33 is laminated on the device electrodes 31, 32 after the device electrodes 31, 32 and the step-forming section 35 have been formed. Although the electron-emitting region 34 is formed in the step-forming section 35 in FIG. 14, the shape and position of the electron-emitting region 34 depend on conditions of the manufacture process, the forming process, etc. and are not limited to illustrated ones.

Figure 15A:
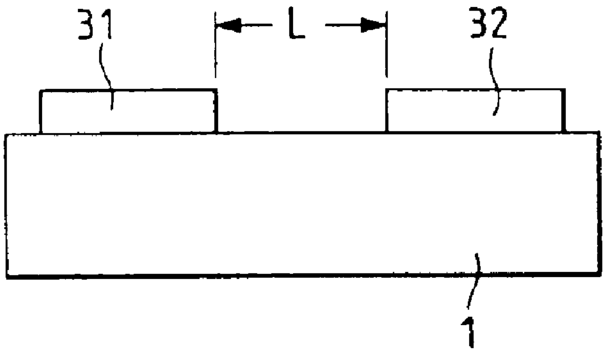
FIGS. 15A to 15C are schematic views showing successive manufacture steps of the surface conduction electron-emitting device.
Figure 15B:
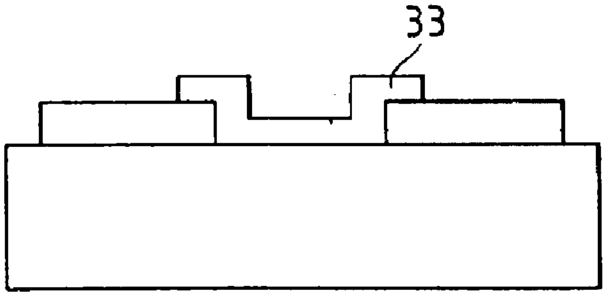
Figure 15C:
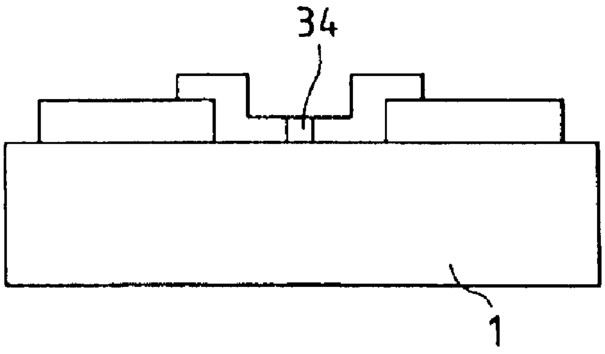

While the surface conduction electron-emitting devices explained above can be manufactured by various methods, FIGS. 15A to 15C schematically show one example of the manufacture process.

One example of the manufacture process will be described below with reference to FIGS. 13A and 13B and FIGS. 15A to 15C. In FIGS. 15A to 15C, the same components as those in FIGS. 13A and 13B are denoted by the same reference numerals.

1) The base plate 1 is sufficiently washed with a detergent, pure water, an organic solvent and the like. A device electrode material is then deposited on the base plate by vacuum evaporation, sputtering or the like. After that, the deposited material is patterned by photolithography etching to form the device electrodes 31, 32 (FIG. 15A).

2) Over the base plate 1 having the device electrodes 31, 32 formed thereon, an organic metal solution is coated to form an organic metal thin film. The organic metal solution may be of a solution of an organic metal compound containing, as a primary element, a material metal of the conductive thin film 33. The organic metal thin film is heated for baking and then patterned by lift-off, etching or the like to form the conductive thin film 33 (FIG. 15B). While the organic metal solution is coated in this example, the process of forming the conductive thin film 33 is not limited to coating, but may be carried out by any other suitable method such as vacuum evaporation, sputtering, chemical vapor deposition, spinning or spraying.

3) Subsequently, the base plate including the device electrodes and the conductive thin film is subjected to the forming process. A process by energization will be described here as one example of the forming process. When an appropriate voltage is applied to between the device electrodes 31, 32 from a power supply (not shown), part of the conductive thin film 33 is changed in its structure to form the electron-emitting region 34 (FIG. 15C). With the forming process by energization, the conductive thin film 33 is locally destroyed, deformed or denatured to change the structure in its part. This part of the conductive thin film 33 becomes the electron-emitting region 34. Examples of voltage waveform applied for the forming by energization are shown in FIGS. 16A and 16B.

The voltage waveform is preferably of a pulse-like waveform. The forming process by energization can be performed by applying voltage pulses having a constant crest value successively as shown in FIG. 16A, or by applying voltage pulses having crest values gradually increased as shown in FIG. 16B.

Figure 16A:
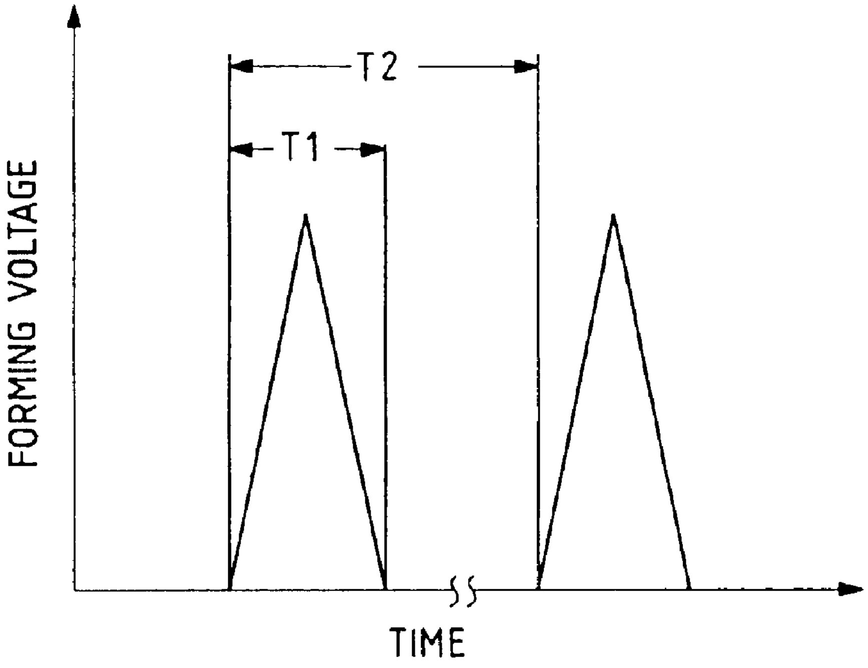
FIGS. 16A and 16B are charts showing examples of voltage waveforms which can be applied in the forming process by energization to manufacture the surface conduction electron-emitting device.

In FIG. 16A, T1 and T2 represent respectively a pulse width and a pulse interval of the voltage waveform. Usually, T1 is set to fall in the range of 1 μs to 10 ms and T2 is set to fall in the range of 10 μs to 100 ms. A crest value of the triangular waveform (i.e., a peak value in the forming process by energization) is appropriately selected depending on the type of surface conduction electron-emitting device. Under these conditions, the voltage is applied for, e.g., several seconds to several tens of minutes. The pulse is not limited to the triangular waveform, but may have any other desired waveform such as rectangular one.

Figure 16B:
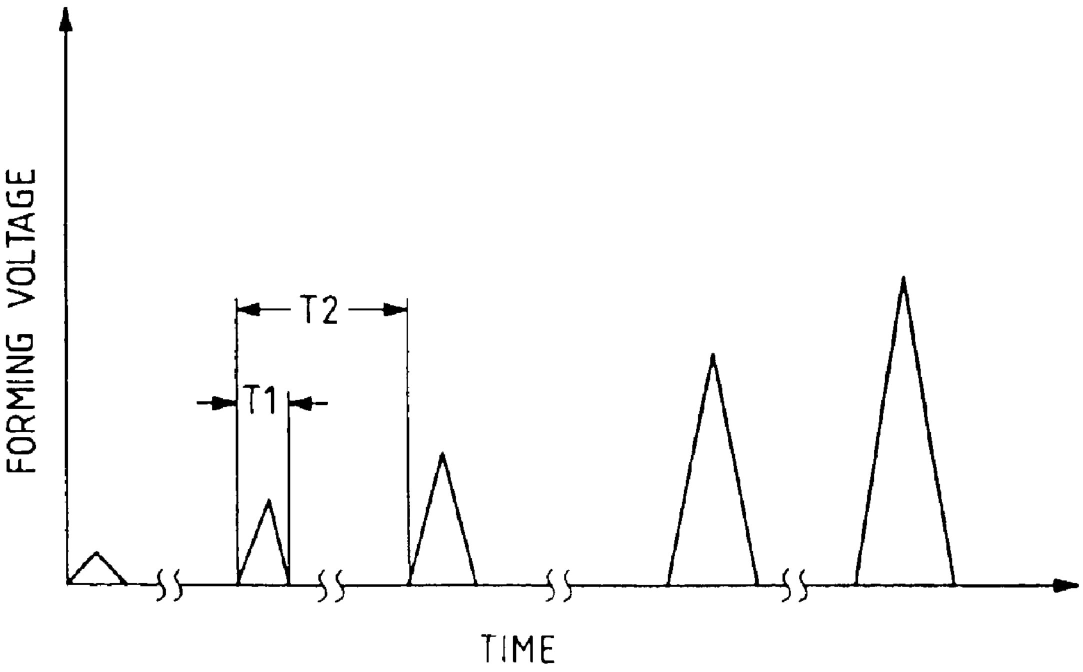

In the method shown in FIG. 16B, T1 and T2 can be set to the similar values as in the method shown in FIG. 16A. A crest value of the triangular waveform (i.e., a peak value in the forming process by energization) is increased, for example, at a rate of 0.1 V per pulse.

The time at which the forming process by energization is to be completed can be detected by applying a voltage whose value is so selected as not to locally destroy or deform the conductive thin film 33, and measuring a current during the pulse interval T2. By way of example, while applying a voltage of about 0.1 V to the device, a resulting device current is measured to determine a resistance value and, when the resistance value exceeds 1 MΩ, the forming process by energization is finished.

4) After the forming process by energization, the electron-emitting device is subjected to an activation process. The activation process remarkably changes a device current If and an emission current Ie.

The activation process can be performed by periodically applying a pulse to the device as with the forming process by energization, but in an atmosphere containing gas of an organic material. This atmosphere is obtained by evacuating the envelope through the vent tube by an ion pump to create a sufficiently high degree of vacuum and then introducing gas of a selected organic material to the vacuum space. A preferable gas pressure of the organic material depends on the form of application, the configuration of the envelope (vacuum container), the kind of organic material, etc. and, hence, it is appropriately set case by case. Examples of suitable organic materials include aliphatic hydrocarbons such as alkanes, alkenes and alkynes, aromatic hydrocarbons, alcohols, aldehydes, ketones, amines, and organic acids such as phenol, carboxylic acid and sulfonic acid. More specifically, the suitably usable organic materials are saturated hydrocarbons expressed by $C_nH_{2n+2}$ such as methane, ethane and propane, unsaturated hydrocarbons expressed by $C_nH_{2n}$ such as ethylene and propylene, benzene, toluene, methanol, ethanol, formaldehyde, acetone, methyl ethyl ketone, methylamine, ethylamine, phenol, formic acid, acetic acid, propionic acid, etc. As a result of the activation process, carbon or carbon compounds are deposited on the device from the organic material present in the atmosphere so that the device current If and the emission current Ie are remarkably changed.

The timing to finish the activation process is determined while measuring the device current If and the emission current Ie. The width, interval and crest value of the applied pulse is appropriately set.

The carbon or the carbon compounds are in the form of graphite such as HOPG (Highly Oriented Pyrolitic Graphite), PG (Pyrolitic Graphite), and GC (Glassy Carbon) (HOPG means graphite having a substantially complete crystal structure, PG means graphite having a crystal grain size of 200 Å and a crystal structure slightly disordered, and GC means graphite having a crystal grain size of 20 Å and a crystal structure more disordered), or amorphous carbon (including amorphous carbon alone and a mixture of amorphous carbon and fine crystals of any above graphite). The thickness of the deposited carbon or the carbon compounds is preferably not larger than 500 Å, more preferably not larger than 300 Å.

5) It is preferable that the electron-emitting device after the activation process is subjected to a stabilization process. The stabilization process is desirably performed on condition that the organic material in the vacuum container has a partial pressure of $1\times10^{-8}$ torr or less, preferably to $1\times10^{-10}$ torr or less. The pressure in the vacuum container is preferably in the range of $10^{-6.5}$ to $10^{-7}$ torr, more preferably $1\times10^{-8}$ torr or less. An apparatus for evacuating the vacuum container is preferably of the type using no oil so that oil generated from the evacuation apparatus will not affect characteristics of the electron-emitting device. Practical examples of the evacuation apparatus include a sorption pump and an ion pump. Further preferably, when evacuating the vacuum container, the entire vacuum container is heated so that organic material molecules adsorbed to inner walls of the vacuum container and the electron-emitting devices are easily discharged. It is desired that the vacuum container is heated to 80 to 200° C. for 5 hours or more while it is being evacuated. The heating conditions are not limited the above conditions, but may be changed depending on the size and shape of the vacuum container, the configuration of the electron-emitting device, and others. Incidentally, the partial pressure of the organic materials is determined by measuring partial pressures of organic molecules mainly consisted of carbon and hydrogen and having the mass number in the range of 10 to 200 by a mass spectrometer, and integrating the measured partial pressures.

The atmosphere in which the electron-emitting devices are driven after the stabilization process is preferably maintained in the same atmosphere as achieved just after the stabilization process, but this condition is not strictly required. If the organic material is sufficiently removed, satisfactorily stable characteristics can be maintained even if the degree of vacuum is reduced a little.

By establishing the vacuum atmosphere as mentioned above, it is possible to prevent deposition of new carbon or carbon compounds. As a result, the device current If and the emission current Ie are stabilized.

Figure 17:
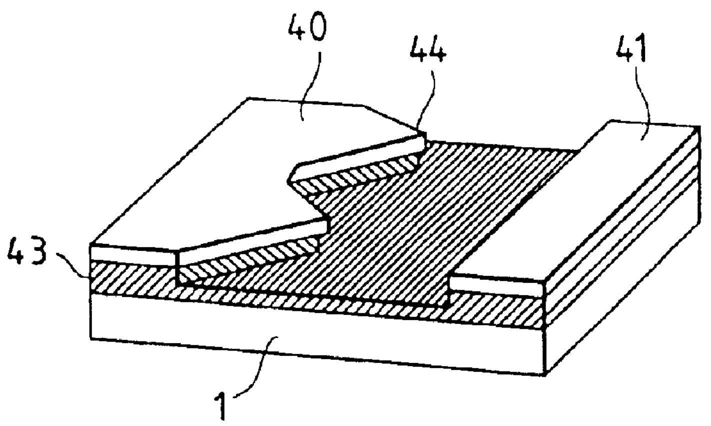
FIG. 17 is a schematic view showing an FE electron-emitting device.

FIG. 17 schematically shows a structure of an FM electron-emitting device. In FIG. 17, denoted by 1 is a base plate, 40 is a negative electrode, 41 is a positive electrode, 43 is an insulating layer, and 44 is an electron-emitting region.

Figure 18:
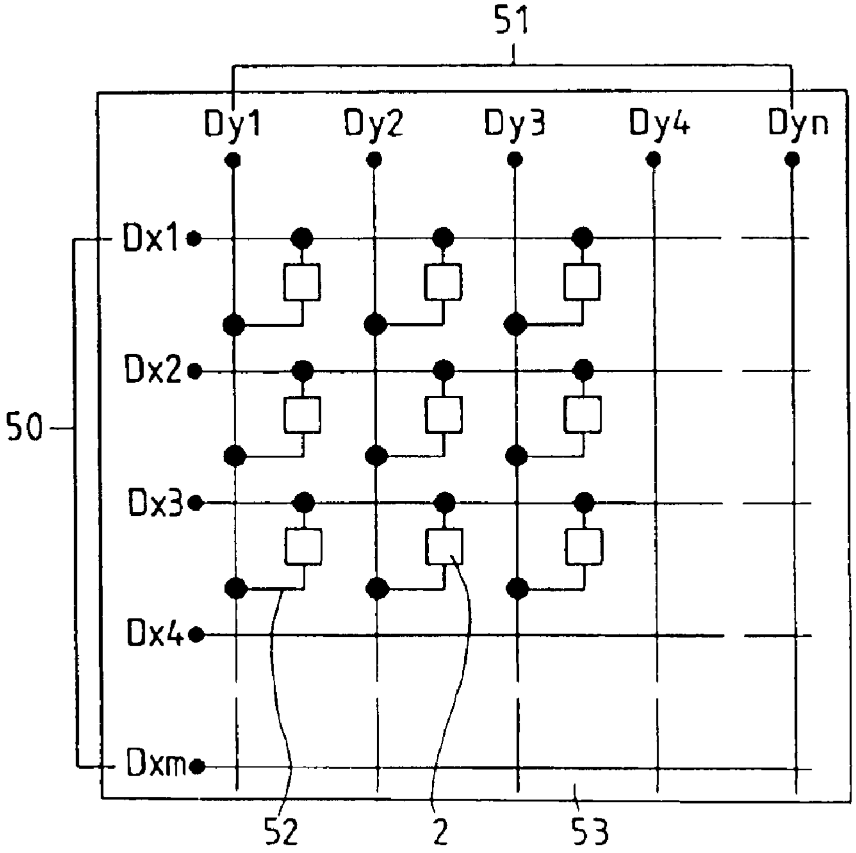
FIG. 18 is a schematic view showing one example of a base plate for an electron source in a matrix pattern.

FIG. 18 schematically shows a base plate on which a plurality of surface conduction electron-emitting devices are arrayed in a matrix pattern. In FIG. 18, denoted by 53 is a base plate, 50 is an X-directional wiring, 51 is a Y-directional wiring, Z is a surface conduction electron-emitting device, and 2 is a connecting wire. The surface conduction electron-emitting device 2 may be of the flat type or the step type. As an alternative, it may be an FE electron-emitting device as shown in FIG. 17.

The X-directional wiring 50 is arranged in number m as indicated by Dx1, Dx2, . . . , Dxm, and can be formed of, e.g., conductive metal by vacuum evaporation, printing, sputtering or the like. The material, thickness and width of the wiring are appropriately designed. The Y-directional wiring 51 is arranged in number n as indicated by Dy1, Dy2, . . . , Dyn, and are formed as with the X-directional wiring 50. An interlayer insulating layer (not shown) is interposed between the number m of X-directional wirings 50 and the number n of Y-directional wirings 51 to electrically separate both the wirings from each other (m, n being each a positive integer).

The not-shown interlayer insulating layer is formed of, e.g., $SiO_2$ by vacuum evaporation, printing, sputtering or the like. The interlayer insulating layer is entirely or partly formed in a desired pattern on the base plate 53 having the X-directional wirings 50 already formed thereon, for example. The thickness, material and manufacture process of the interlayer insulating layer is set so that the layer is endurable against, particularly, a potential difference developed in the points where the X-directional wirings 50 and the Y-directional wirings 51 are crossing each other. The X-directional wirings 50 and the Y-directional wirings 51 are led out of the envelope (vacuum container) through respective external terminals.

A pair of device electrodes (not shown in FIG. 18) of each surface conduction electron-emitting device 2 are electrically connected to the X-directional wirings 50 and the Y-directional wirings 51, respectively, by the connecting wires 52 formed of conductive metal or the like.

As to materials of the wirings 50, 51, the connecting wires 52, and the pair of device electrodes, constituent elements may be the same in whole or in part, or different from one another. The materials of these components are appropriately selected, for example, from the materials cited above for the device electrodes. When the device electrodes and the wirings are made of the same material, the term "device electrodes" is often used as including the wirings connected to the device electrodes.

Connected to the X-directional wirings 50 is a scan signal applying means (not shown) for applying a scan signal to select one row of the surface conduction electron-emitting devices arrayed in the X-direction. On the other hand, connected to the X-directional wirings 51 is a modulation signal applying means (not shown) for applying a modulation signal to a selected column of the surface conduction electron-emitting devices arrayed in the Y-direction. A differential voltage between the scan signal and the modulation signal applied to each surface conduction electron-emitting device serves as a driving voltage for the same device.

The foregoing arrangements enable the individual devices to be selected and driven independently of each other in simple matrix wiring.

One example of the image-forming apparatus constructed by using the electron source made up in the simple matrix wiring is shown in FIG. 1.

Figure 19A:
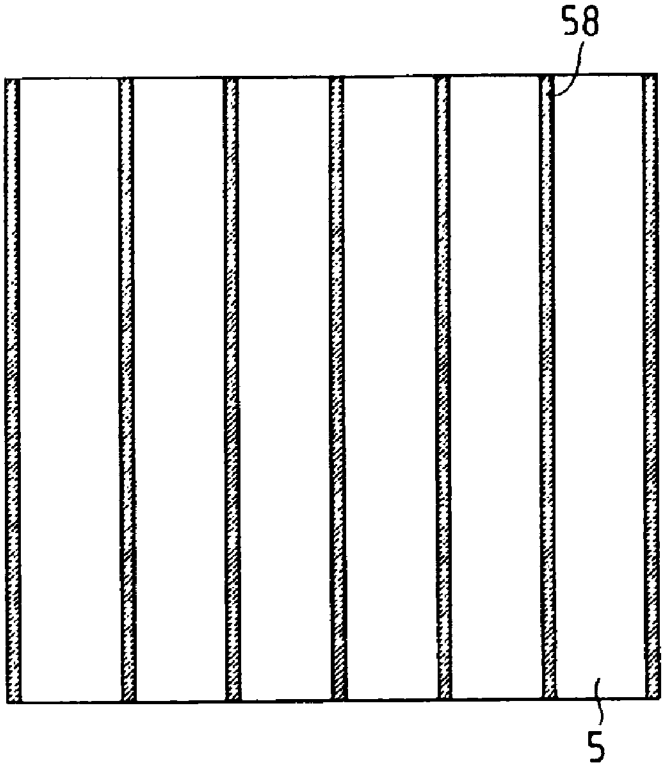
FIGS. 19A and 19B are schematic views showing examples of a fluorescent film.
Figure 19B:
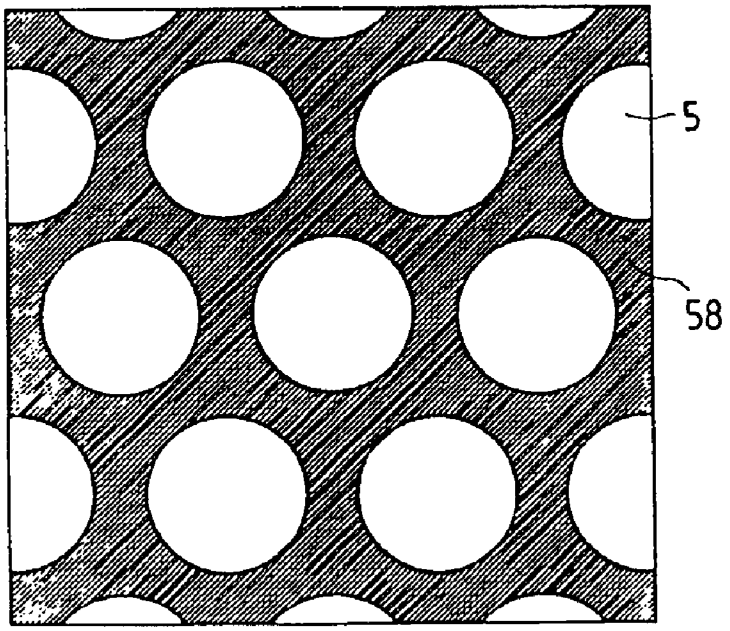

FIGS. 19A and 19B schematically show examples of the fluorescent film 5. The fluorescent film 5 can be formed of fluorescent substances alone for a monochrome display. For a color display, the fluorescent film 5 is formed by a combination of black film 58 and fluorescent substances, the black film 58 being called black stripes or a black matrix depending on patterns of the fluorescent substances. The purposes of providing the black stripes or black matrix are to provide black areas between the fluorescent substances in three primary colors necessary for color display, so that color mixing becomes less conspicuous and a reduction in contrast caused by reflection of exterior light is suppressed. The black stripes or the like can be made of a material containing graphite as a main ingredient which is usually employed in the art, or any other materials which have small transmittance and reflectance to light.

Fluorescent substances can be coated on a glass base plate by precipitation, printing or the like regardless of whether the image is monochrome or colored. On an inner surface of the fluorescent film 5, a metal back is usually provided. The metal back has functions of increasing the luminance by mirror-reflecting light, that is emitted from the fluorescent substance to the inner side, toward the face plate 4, serving as an electrode to apply a voltage for accelerating an electron beam, and protecting the fluorescent substance from being damaged by collisions with negative ions produced in the envelope. The metal back can be fabricated, after forming the fluorescent film, by smoothing an inner surface of the fluorescent film (this step being usually called filming) and then depositing Al thereon by vacuum evaporation, for example.

To increase conductivity of the fluorescent film 5, the face plate 4 may include a transparent electrode (not shown) provided on an outer surface of the fluorescent film 5 (i.e., the surface facing the glass base plate).

Before hermetically sealing of the envelope, careful alignment must be performed in the case of a color display so that the fluorescent substances in respective colors and the electron-emitting devices are precisely positioned corresponding to each other.

The image-forming apparatus shown in FIG. 1 is manufactured, by way of example, as follows.

The envelope is evacuated through the vent tube 9 by an evacuation apparatus using no oil, such as an ion pump and a sorption pump, while properly heating it as with the above-explained activation process. After creating an atmosphere in which a vacuum degree is about $10^{-7}$ torr and the amount of organic material is very small, the envelope is hermetically sealed off. To maintain a vacuum degree in the envelope after hermetically sealing it off, the envelope may be subjected to gettering. This process is performed by, immediately before or after sealing off the envelope, heating a getter disposed in a predetermined position (not shown) within the envelope by resistance heating or high-frequency heating so as to form an evaporation film of the getter. The getter usually contains Ba as a primary component. The inner space of the envelope can be maintained at a vacuum degree in the range of $1\times10^{-5}$ to $1\times10^{-7}$ torr by the adsorbing action of the evaporation film.

Figure 20:
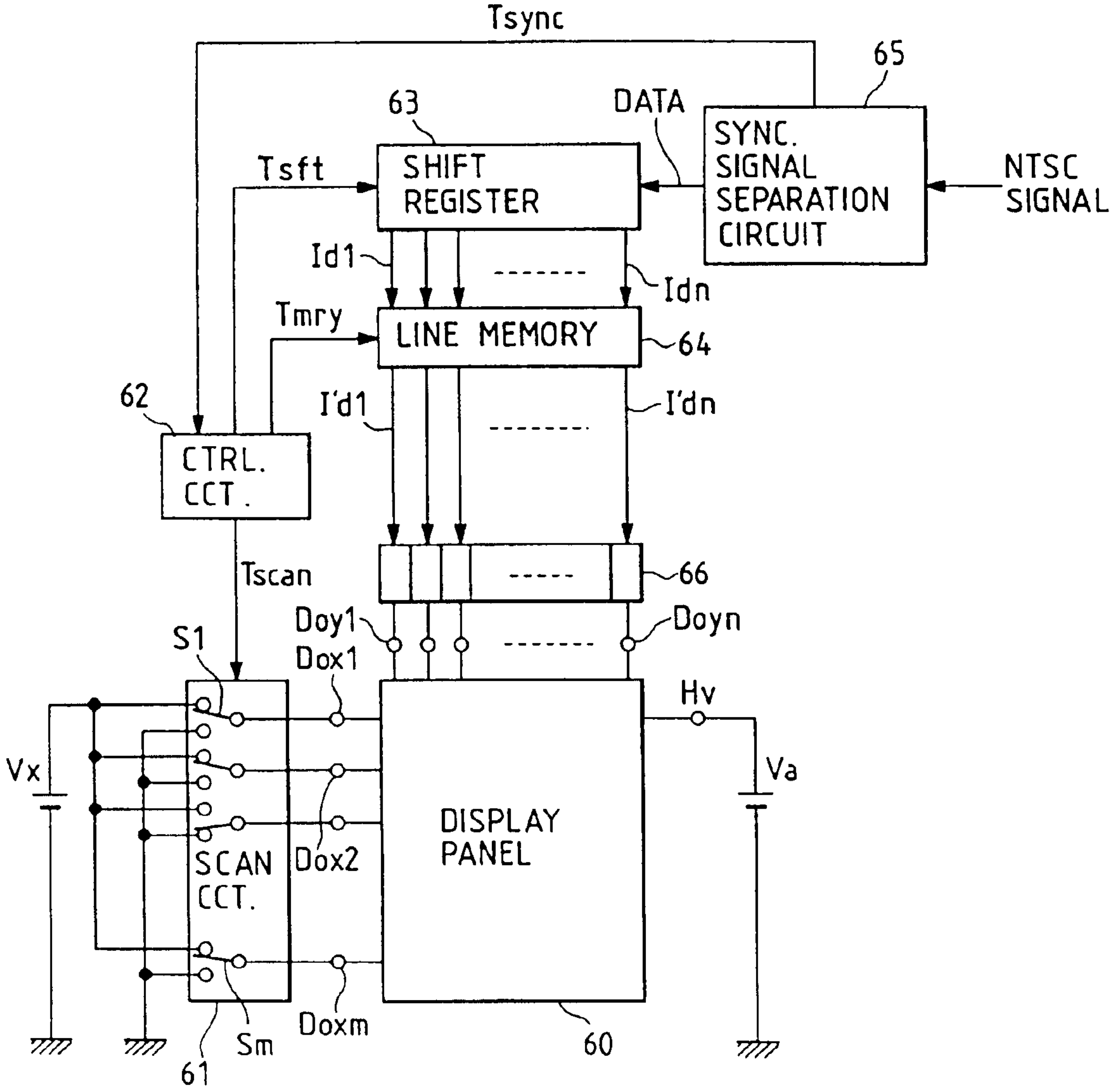
FIG. 20 is a block diagram showing one example of a driving circuit adapted to display an image in accordance with TV signals of NTSC standards.

One example of a driving circuit for displaying a TV image in accordance with a TV signal of NTSC standards on a display panel by using the electron source made up in the simple matrix wiring will be described below with reference to FIG. 20. In FIG. 20, denoted by 60 is a display panel, 61 is a scanning circuit, 62 is a control circuit, 63 is a shift register, 64 is a line memory, 65 is a synch signal separating circuit, 66 is a modulation signal generator, and Vx and Va are DC voltage sources.

The display panel 60 is connected to the external electrical circuits through terminals Dox1 to Doxm, terminals Doy1 to Doyn, and a high-voltage terminal Hv. Applied to the terminals Dox1 to Doxm is a scan signal for successively driving the electron source provided in the display panel, i.e., a group of surface conduction electron-emitting devices wired into a matrix of m rows and n columns, on a row-by-row basis (i.e., in units of n devices).

Applied to the terminals Doy1 to Doyn is a modulation signal for controlling electron beams output from the surface conduction electron-emitting devices in one row selected by the scan signal. The high-voltage terminal Hv is supplied with a DC voltage of 10 kV, for example, from the DC voltage source Va. This DC voltage serves as an accelerating voltage for giving the electron beams emitted from the surface conduction electron-emitting devices energy enough to excite the corresponding fluorescent substances.

The scanning circuit 61 will now be described. The scanning circuit 61 includes a number m of switching devices (schematically shown at S1 to Sm in FIG. 20). Each of the switching devices selects an output voltage of the DC voltage source or 0 V (ground level), and is electrically connected to corresponding one of the terminals Dox1 to Doxm of the display panel 60. The switching devices S1 to Sm are operated in accordance with a control signal Tscan output by the control circuit 62, and are made up by a combination of typical switching devices such as FETs.

The DC voltage source Vx outputs a constant voltage set in this embodiment based on characteristics of the surface conduction electron-emitting devices (i.e., electron-emitting threshold voltage) so that the driving voltage applied to the devices not under scanning is kept lower than the electron-emitting threshold voltage.

The control circuit 62 functions to make the various components operated in match with each other so as to properly display an image in accordance with a video signal input from the outside. Thus, in accordance with a synch signal Tsyn supplied from the synch signal separating circuit 65, the control circuit 62 generates control signals Tscan, Tsft and Tmry to the associated components.

The synch signal separating circuit 65 is a circuit for separating a synch signal component and a luminance signal component from an NTSC TV signal applied from the outside, and can be made up using typical frequency separators (filters) or the like. The synch signal separated by the synch signal separating circuit 65 comprises a vertical synch signal and a horizontal synch signal, but it is here represented by the signal Tsync for convenience of description. Also, the video luminance signal component separated from the TV signal is represented by a signal DATA for convenience of description. The signal DATA is input to the shift register 63.

The shift register 63 carries out serial/parallel conversion of the signal DATA, which is time-serially input to the register, for each line of an image. The shift register 63 is operated by the control signal Tsft supplied from the control circuit 62 (hence, the control signal Tsft can be said as a shift clock for the shift register 63). Data for one line of the image (corresponding to data for driving the number n of electron-emitting devices) resulted from the serial/parallel conversion is output from the shift register 63 as a number n of parallel signals Id1 to Idn.

The line memory 64 is a memory for storing the data for one line of the image for a required period of time. The line memory 64 stores the contents of the parallel signals Id1 to Idn in accordance with the control signal Tmry supplied from the control circuit 62. The stored contents are output as I'd1 to I'dn and applied to the modulation signal generator 66.

The modulation signal generator 66 is a signal source for properly driving the surface conduction electron-emitting devices in accordance with the respective video data I'd1 to I'dn in a modulated manner. Output signals from the modulation signal generator 66 are applied to the corresponding surface conduction electron-emitting devices in the display panel 60 through the terminals Doy1 to Doyn.

The present electron-emitting devices used in the display panel of this embodiment each have basic characteristics below with regards to the emission current Ie. Specifically, the electron-emitting device has a definite threshold voltage Vth for emission of electrons and emits electrons only when a voltage exceeding Vh is applied. For the voltage exceeding the electron emission threshold, the emission current is also changed depending on changes in the voltage applied to the device. Therefore, when a pulse voltage is applied to the device, no electrons are emitted if the applied voltage is lower than the electron emission threshold value, but an electron beam is produced if the applied voltage exceeds lower than the electron emission threshold value. At this time, the intensity of the produced electron beam can be controlled by changing a crest value Vm of the pulse. Further, the total amount of charges of the produced electron beam can be controlled by changing a width Ps of the pulse.

Thus, the electron-emitting device can be modulated in accordance with an input signal by a voltage modulating method, a pulse width modulating method and so on. In the case of employing the voltage modulating method, the modulation signal generator 66 can be realized by using a circuit which generates a voltage pulse having a fixed length and modulates a crest value of the voltage pulse in accordance with input data.

In the case of employing the pulse width modulating method, the modulation signal generator 66 can be realized by using a circuit which generates a voltage pulse having a fixed crest value and modulates a width of the voltage pulse in accordance with input data.

The shift register 63 and the line memory 64 may be designed to be adapted for any of a digital signal and an analog signal. This is because the serial/parallel conversion and storage of the video signal are only required to be effected at a predetermined speed.

For digital signal design, it is required to convert the signal DATA output from the synch signal separating circuit 65 into a digital signal, but this can be realized just by incorporating an A/D converter in an output portion of the circuit 65. Further, depending on whether the output signal of the line memory 64 is digital or analog, the circuit used for the modulation signal generator 66 must be designed in somewhat different ways. When the voltage modulating method using a digital signal is employed, the modulation signal generator 66 is modified to include a D/A converter and, if necessary, an amplifier and so on. When the pulse width modulating method using a digital signal is employed, the modulation signal generator 66 is modified to include a circuit in combination of, for example, a high-speed oscillator, a counter for counting the number of waves output from the oscillator, and a comparator for comparing between an output value of the counter and an output value of the line memory. In this case, if necessary, an amplifier for amplifying a voltage of the modulation signal, which is output from the comparator and has a modulated pulse width, to the driving voltage for the surface conduction electron-emitting devices may also be added.

When the voltage modulating method using an analog signal is employed, the modulation signal generator 66 can be made up by an amplifier using, e.g., an operational amplifier and, if necessary, may additionally include a level shift circuit. When the pulse width modulating method using an analog signal is employed, the modulation signal generator 66 can be made up by a voltage controlled oscillator (CVO), for example. In this case, if necessary, an amplifier for amplifying a voltage of the modulation signal to the driving voltage for the surface conduction electron-emitting devices may also be added.

In the thus-arranged image display of this embodiment, electrons are emitted by applying a voltage to the electron-emitting devices through terminals Dox1 to Doxm and Doy1 to Doyn extending outwardly of the envelope. The electron beams are accelerated by applying a high voltage to the metal back 6 or the transparent electrode (not shown) through the high-voltage terminal Hv. The accelerated electrons impinge against the fluorescent film 5 and hence the fluorescent substances which generate fluorescence to form an image.

The above-explained arrangements of the image-forming apparatus is only by way of example, and may be variously modified based on the technical concept of the present invention. The input signal is not limited to an NTSC TV signal mentioned above, but may be any of other TV signals of PAL- and SECAM-standards, including another type of TV signal (e.g., so-called high-quality TV signal of MUSE-standards) having the larger number of scan lines than the above types.

Figure 21:
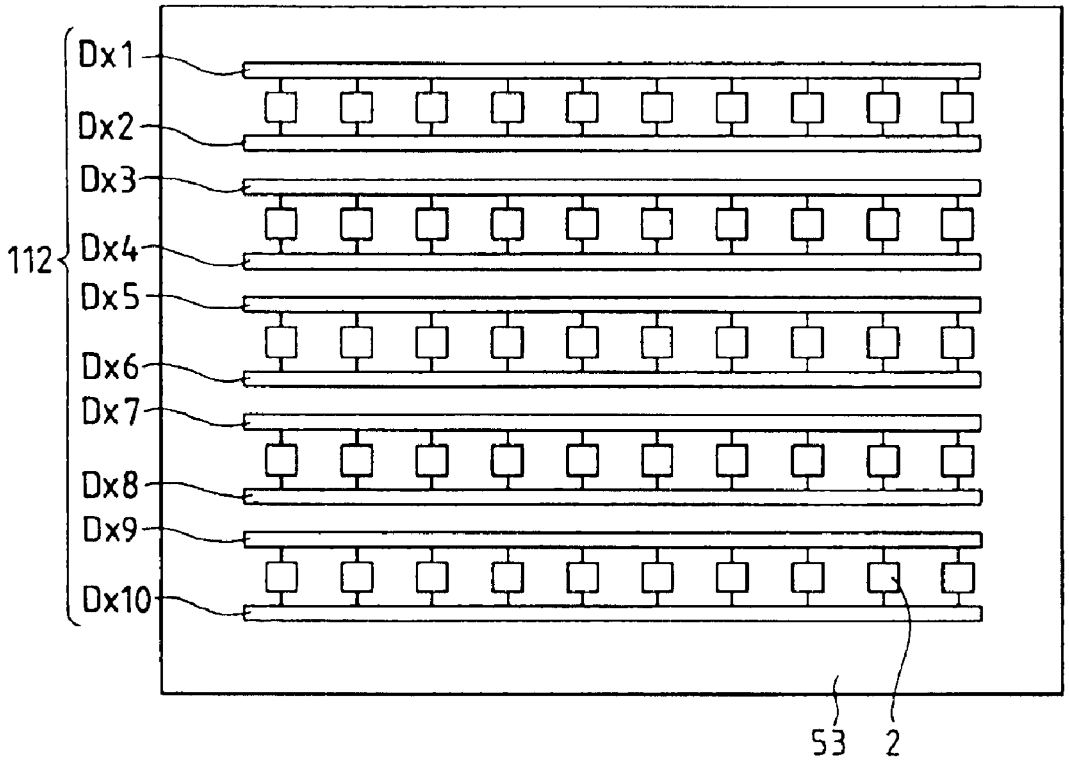
FIG. 21 is a schematic view showing one example of a base plate for an electron source in a ladder pattern.
Figure 22:
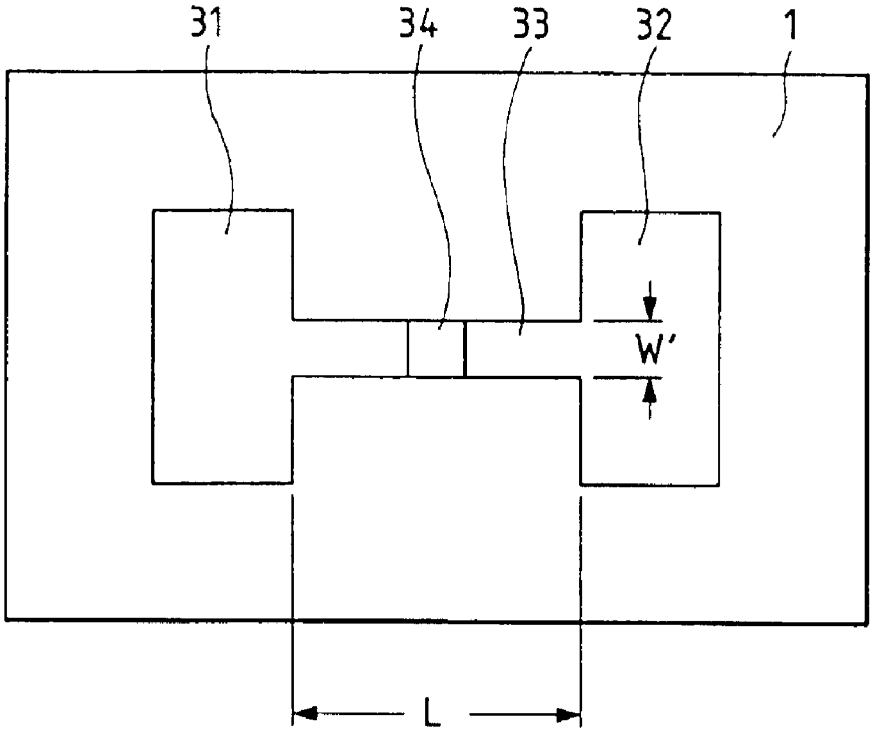
FIG. 22 PRIOR ART
FIG. 22 is a schematic view of a typical surface conduction electron-emitting device.
Figure 23:
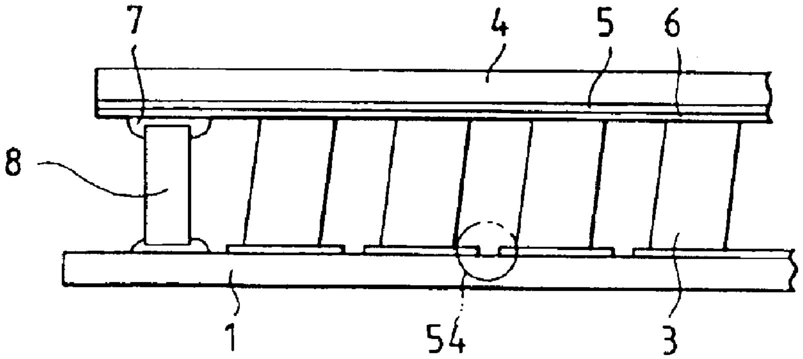
FIG. 23 PRIOR ART
FIG. 23 is a schematic view showing a conventional image-forming apparatus using typical surface conduction electron-emitting devices.

FIG. 21 schematically shows one example of an electron source in a ladder pattern. In FIG. 21, denoted by 53 is a base plate and 2 is an electron-emitting device. The electron-emitting devices 2 are interconnected by common wirings 112 indicated by Dx1 to Dx10. A plurality of electron-emitting devices 2 are arrayed on the base plate 53 in parallel to line up in the X-direction (a resulting row of the electron-emitting devices being called a device row). This device row is arranged in plural number so as to make up an electron source. By applying a driving voltage to between the common wirings of each device row, respective device rows can be driven independently of each other. Specifically, a voltage exceeding the electron emission threshold value is applied to the device rows from which electron beams are to be emitted, whereas a voltage lower than the electron emission threshold value is applied to the device rows from which electron beams are not to be emitted. Incidentally, those pairs of the common wirings Dx2 to Dx9 which are between two adjacent device rows, e.g., Dx2 and Dx3, may be each formed as a single wiring.

The present invention will be described below in detail with reference to practical examples, but is not limited to the following examples.

EXAMPLE 1

Figure 2:
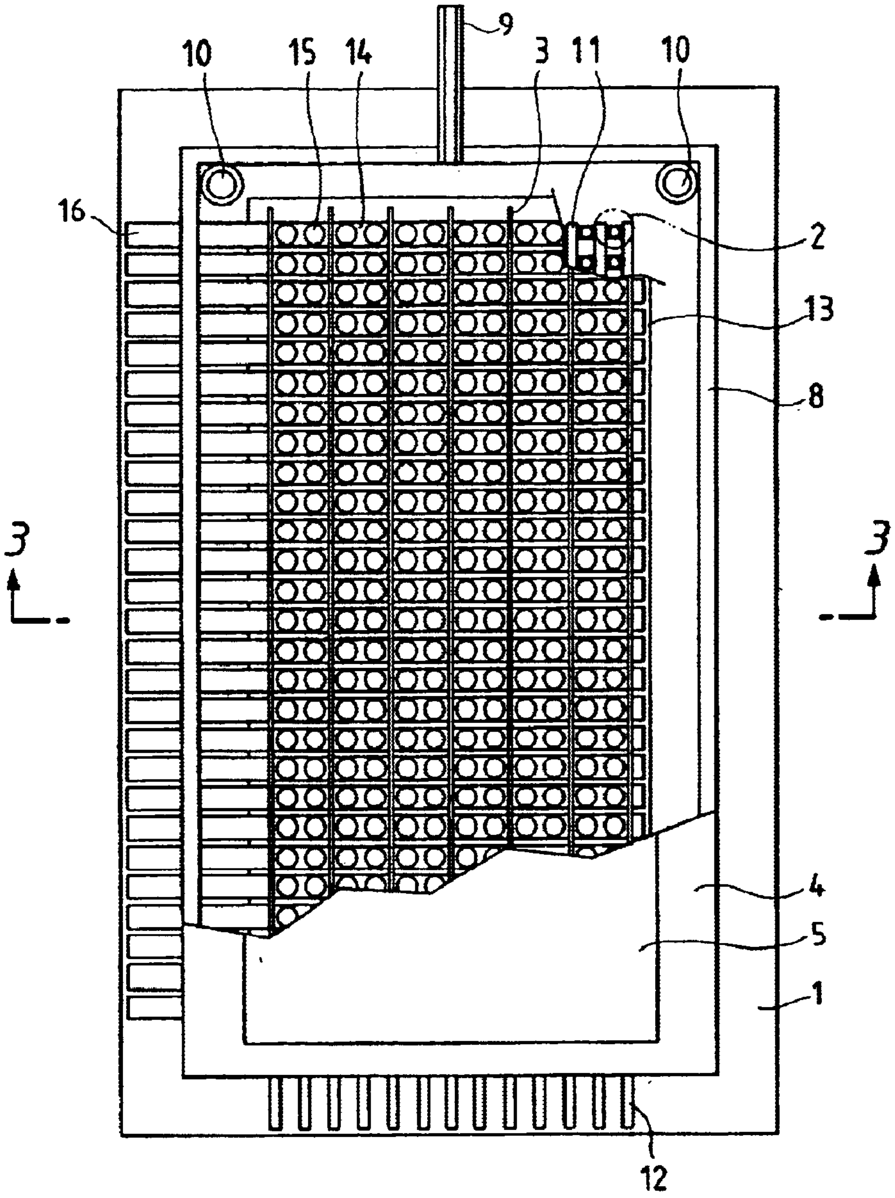
FIGS. 2 to 12 are schematic views for explaining some embodiments of the image-forming apparatus of the present invention.
Figure 3:
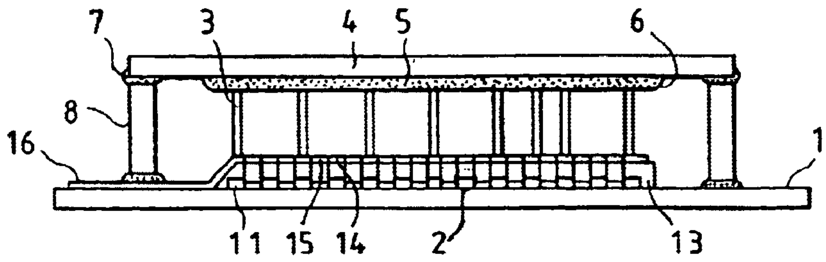

FIG. 2 is a plan view showing arrangements of this Example, and FIG. 3 is a sectional view taken along line 3—3 in FIG. 2. This Example concerns an image-forming apparatus using surface conduction electron-emitting devices as electron-emitting devices.

In FIGS. 2 and 3, the image-forming apparatus comprises a rear plate 1 made of glass, electron-emitting devices 2, atmospheric pressure bearing members or spacers 3 in the form of flat plates for providing a structure endurable against the atmospheric pressure, a face plate 4 formed of a transparent glass base plate, a fluorescent film 5 formed on an inner surface of the face plate 4, and a metal back 6 provided on a surface of the fluorescent film 5. Denoted by 7 is frit glass for sealing-off and 8 is an outer frame. The base plate 1, the face plate 4 and the outer frame 8 jointly construct an envelope (vacuum container) which is sealed off by the frit glass. A vent pipe 9 through which an inner space of the envelope is evacuated is attached to a side of the outer frame 8 that is positioned across imaginary extensions of the flat-plate spacers 3 in the longitudinal direction thereof.

In the arrangements shown in FIGS. 2 and 3, the inner space of the envelope is held in a vacuum state under pressure of $10^{-6}$ torr, and the atmospheric pressure is borne by both the atmospheric pressure bearing members (spacers) 3 and the outer frame 8.

The image-forming apparatus of this Example will now be described in more detail with reference to FIGS. 2, 3, 13A and 13B.

The base plate 1 was made of soda lime glass and had a size of 240 mm×320 mm. The face plate 4 was also made of soda lime glass, but had a size of 190 mm×270 mm. The device electrodes 31, 32 of each surface conduction electron-emitting device as the electron-emitting device 2 were formed of an Au thin film having a thickness of 1000 Å with the device electrodes having the spacing L of 2 μm therebetween and the length W of 500 μm. A solution of organic metal, i.e., a solution containing organic paradium (CCP-4230 by Okuno Pharmaceutical Co., Ltd.), was coated thereon and then heated for baking at 300° C. for 10 minutes. A conductive thin film, i.e., a fine particle film, composed of fine particles (average diameter: 70 Å) containing paradium as a primary constituent element was thus formed.

Then, a Cu film with a thickness of 2 μm and a width of 300 μm was formed as a wiring 11. An Au film with a thickness of 1 μm and a width of 800 μm was formed as a grid electrode 14, a hole of 1 mm×500 μm was bored as a grid hole 15, and an insulating layer 13 was formed using $SiO_2$ between the wirings 11 and the grid electrodes 14. Here, the metal and $SiO_2$ were formed by sputtering and patterned by the photolithography (including etching, lift-off, etc.). A fluorescent substance of green P-22 was coated on the face plate 4 to form the fluorescent film 5. Ring-shaped getters 10 containing BaAl as a main ingredient and having a diameter of 10 mm and the vent tube 9 of glass with an outer diameter of 6 mm and an inner diameter of 4 mm were fixed to the outer frame 8 using LS-0206 by Nippon Electric Glass Co., Ltd. as the frit glass 7 and heating it to 450° C. for 10 minutes. The atmospheric pressure bearing members (spacers) 3 were made of soda lime glass, each had dimensions of 0.5 mm thickness, 4 mm height and 230 mm length, and were vertically provided with intervals of 2 cm. After assembling the base plate 1 and the face plate 4 with the interposition of the outer frame 8, frit glass (LS-0206 by Nippon Electric Glass Co., Ltd.) was applied to portions where the face plate 4, the base plate 1 and the outer frame 8 adjoin to each other. The assembly was heated in an electrical furnace at 450° C. for 10 minutes, whereby a hermetically sealed envelope was provided.

Next, an inner space of the envelop was evacuated to a pressure on the order of $1\times10^{-6}$ torr by a vacuum pump (not shown) through the vent tube 9. The envelop was then subjected to the forming process by applying a voltage pulse in the triangular waveform (bottom side: 1 msec, period: 10 msec, and crest value: 5 V) for 60 sec, thereby forming an electron-emitting region.

Subsequently, the whole envelop was heated at 130° C. for 24 hours for degassing, while the getters were flashed by high-frequency wave of 350 KHz. The vent tube was then sealed off to complete the image-forming apparatus.

Grid contacts 16 and contact electrodes 12 were connected to an exterior driving circuit (not shown) through flat cables (not shown). A video signal was supplied to the surface conduction electron-emitting devices and the grid electrodes 14 and, simultaneously, a voltage of 5 kV was applied to the fluorescent film 5 and the metal back 6 from a high-pressure power supply (not shown) for displaying an image. As a result, a good image was stably displayed.

Comparative Example 1

An image-forming apparatus was manufactured in exactly the same structure and manner as the image-forming apparatus of Example 1 except that the vent tube 9 was attached to a side of the outer frame 8 which was positioned perpendicularly to the side of the outer frame 8 to which the vent tube 9 was attached in Example 1.

As a result of evacuating a constructed envelope in the same manner as in Example 1, the time taken to evacuate the envelope to the same pressure of $1\times10^{-6}$ torr was 1.5 times the time taken in Example 1. Additionally, as a result of evacuating the envelope of the image-forming apparatus of Example 1 for the same time as in this Comparative Example, the pressure in the envelope was about a half the pressure achieved in the envelope of the image-forming apparatus of this Comparative Example. Thus, the envelope of Example 1 was able to reach a lower final pressure and reduce the amount of residual gas.

EXAMPLE 2

An image-forming apparatus having a plurality of (two) vent tubes will be described below.

Figure 4:
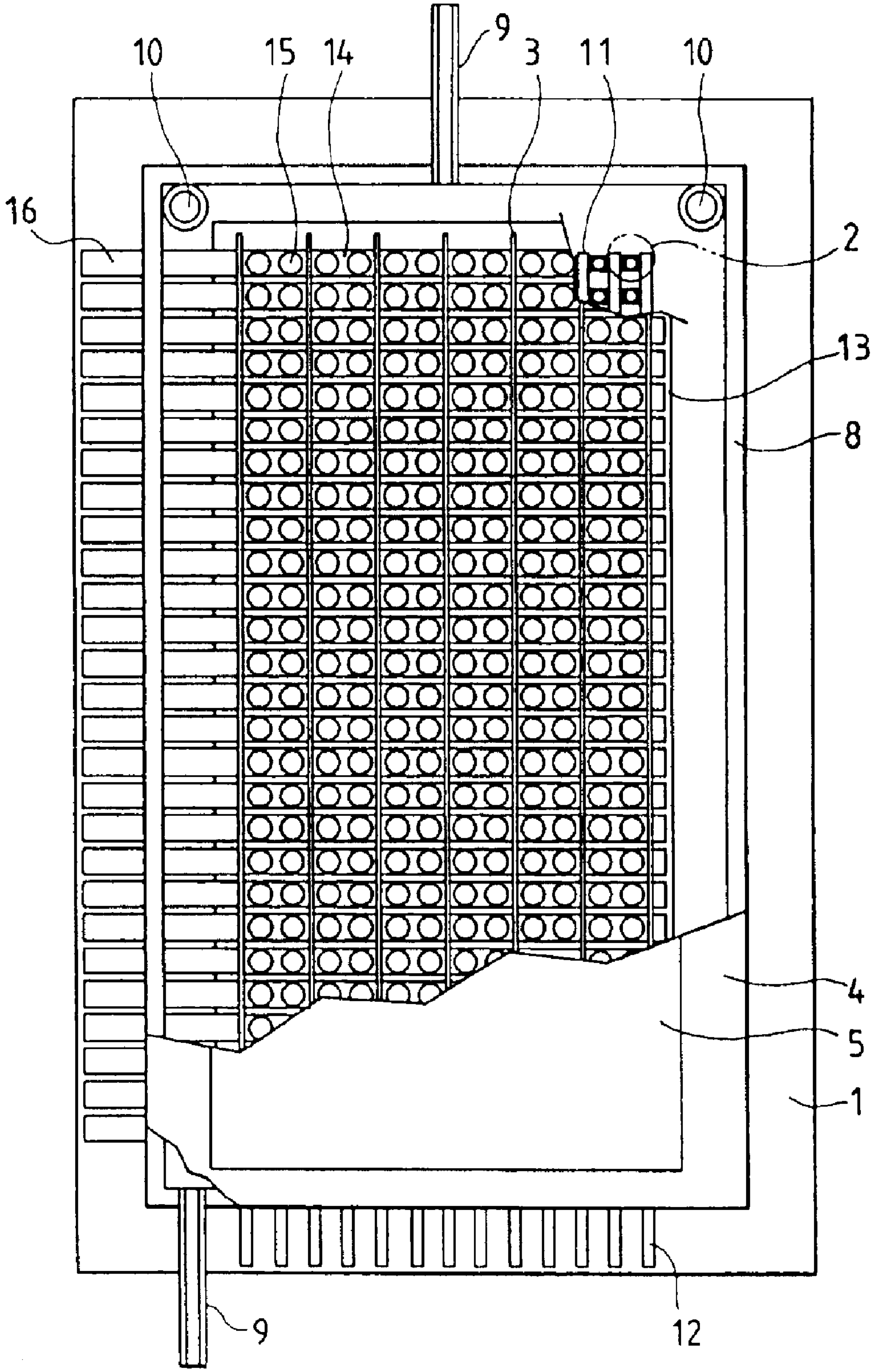

FIG. 4 is a plan view showing arrangements of this Example. In this example, another vent tube was added to the image-forming apparatus of Example 1 shown in FIG. 2. The remaining arrangements are the same as in Example 1 shown in FIG. 2. Therefore, identical components to those in FIG. 2 are denoted by the same reference numerals and will not be described here.

The dimensions, structure and manufacture process of the image-forming apparatus of this Example were selected as with Example 1 except matters relating to the vent tube.

An inner space of a constructed envelope was evacuated through two vent tubes simultaneously to the same pressure of $1\times10^{-6}$ torr as in Example 1. After that, the processes of forming, heating/degassing, and getter flashing were performed and the vent tubes were sealed off as with Example 1, thereby manufacturing an image-forming apparatus. Then, grid contacts 16 and contact electrodes 12 were connected to an exterior driving circuit (not shown) through flat cables (not shown). A video signal was supplied to the surface conduction electron-emitting devices and the grid electrodes 14 and, simultaneously, a voltage of 5 kV was applied to the fluorescent film 5 and the metal back 6 from a high-pressure power supply (not shown) for displaying an image. As a result, a good image was stably displayed for a long term.

Comparative Example 2

An image-forming apparatus was manufactured in exactly the same structure and manner as the image-forming apparatus of Example 1 except that one vent tube was attached to the same position as in Comparative Example 1, and the other vent tube was attached to a side of the outer frame in opposite relation to the side thereof to which one vent tube was attached. As a result of evacuating a constructed envelope in the same manner as in Example 2, the time taken to evacuate the envelope to the same pressure of $1\times10^{-6}$ torr was about 2 times the time taken in Example 2. Additionally, as a result of evacuating the envelope of the image-forming apparatus of Example 2 for the same time as in this Comparative Example, the pressure in the envelope was about a half the pressure achieved in the envelope of the image-forming apparatus of this Comparative Example. Thus, the envelope of Example 2 was able to reach a lower final pressure and reduce the amount of residual gas.

EXAMPLE 3

An image-forming apparatus using a number of strip-shaped atmospheric pressure bearing members (spacers) will be described below.

Figure 5:
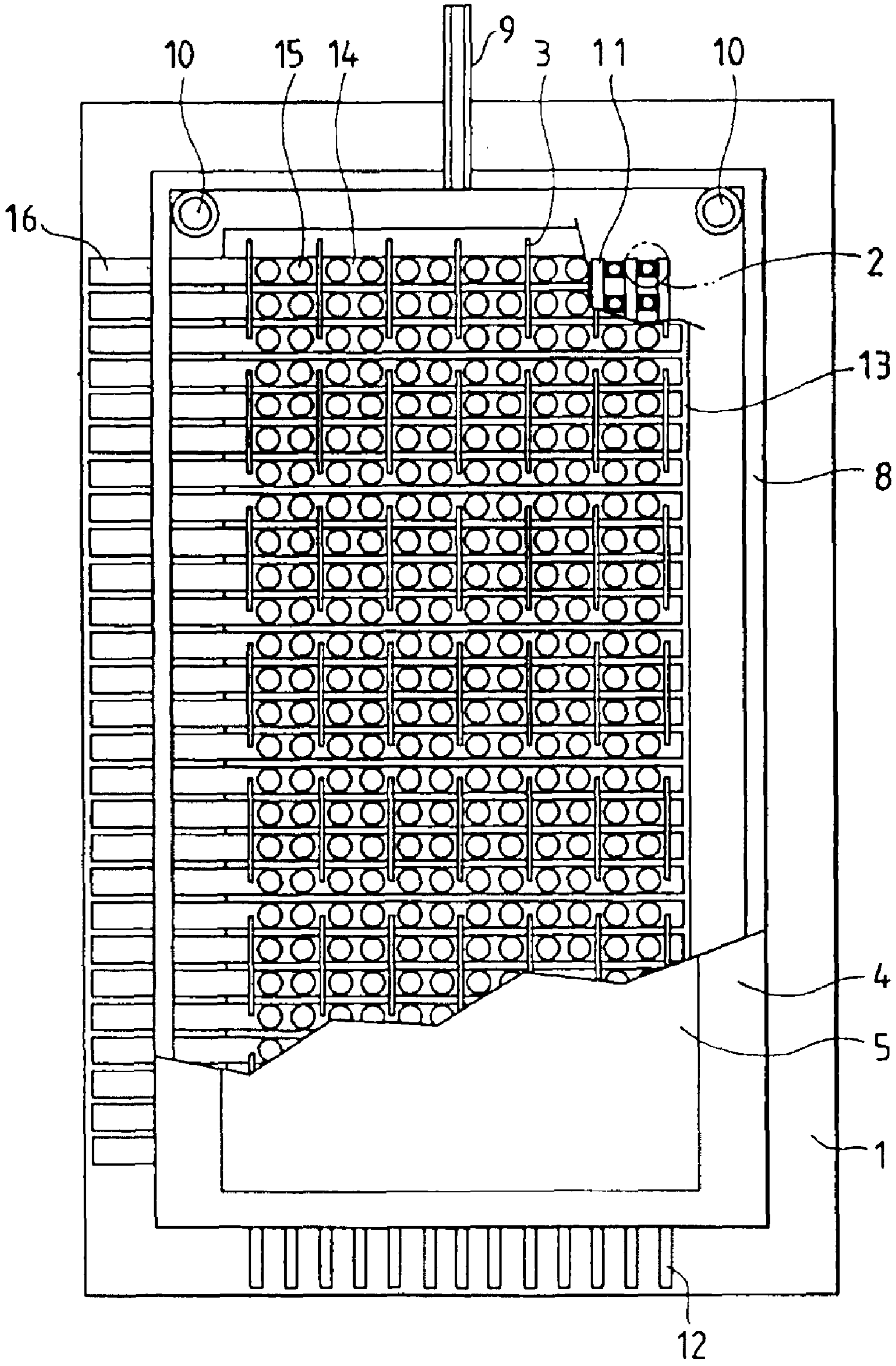

FIG. 5 is a plan view showing arrangements of this Example. In this Example, the atmospheric pressure bearing members in Example 1 are replaced by strip-shaped atmospheric pressure bearing members having a shorter length and arranged in a matrix pattern. The remaining arrangements are the same as in Example 1 shown in FIG. 2. Therefore, identical components to those in FIG. 2 are denoted by the same reference numerals and will not be described here.

Strip-shaped atmospheric pressure bearing members (spacers) 3 were made of soda lime glass, each had dimensions of 0.8 mm thickness, 6 mm height and 30 mm length, and were vertically provided with intervals of 35 mm in the longitudinal direction and 20 mm in the transverse direction. The other structure and dimensions of the electron-emitting devices and the electron source base plate were selected as with Example 1. An image-forming apparatus of this Example was manufactured as with Example 1 in points of the manufacture method, the evacuation method, the pressure to be reached after evacuation, the processes of forming, heating/degassing and getter flashing, as well as sealing-off of the vent tube. Then, grid contacts 16 and contact electrodes 12 were connected to the exterior driving circuit shown in FIG. 20 through flat cables (not shown). A video signal was supplied to the surface conduction electron-emitting devices and the grid electrodes 14 and, simultaneously, a voltage of 5 kV was applied to the fluorescent film 5 and the metal back 6 from a high-pressure power supply (not shown) for displaying an image. As a result, a good image was stably displayed for a long term as with Examples 1 and 2.

Comparative Example 3

An image-forming apparatus was manufactured in exactly the same structure and manner as the image-forming apparatus of Example 3 except that the vent tube 9 was attached to a side of the outer frame 8 which was positioned perpendicularly to the side of the outer frame 8, shown in FIG. 5, to which the vent tube 9 was attached in Example 1. As a result of evacuating a constructed envelope in the same manner as in Example 3, the time taken to evacuate the envelope to the same pressure of $1\times10^{-6}$ torr was about 1.3 times the time taken in Example 3. Additionally, as a result of evacuating the envelope of the image-forming apparatus of Example 3 for the same time as in this Comparative Example, the pressure in the envelope was about a 3/5 of the pressure achieved in the envelope of the image-forming apparatus of this Comparative Example. Thus, the envelope of Example 3 was able to reach a lower final pressure and reduce the amount of residual gas.

EXAMPLE 4

Figure 6:
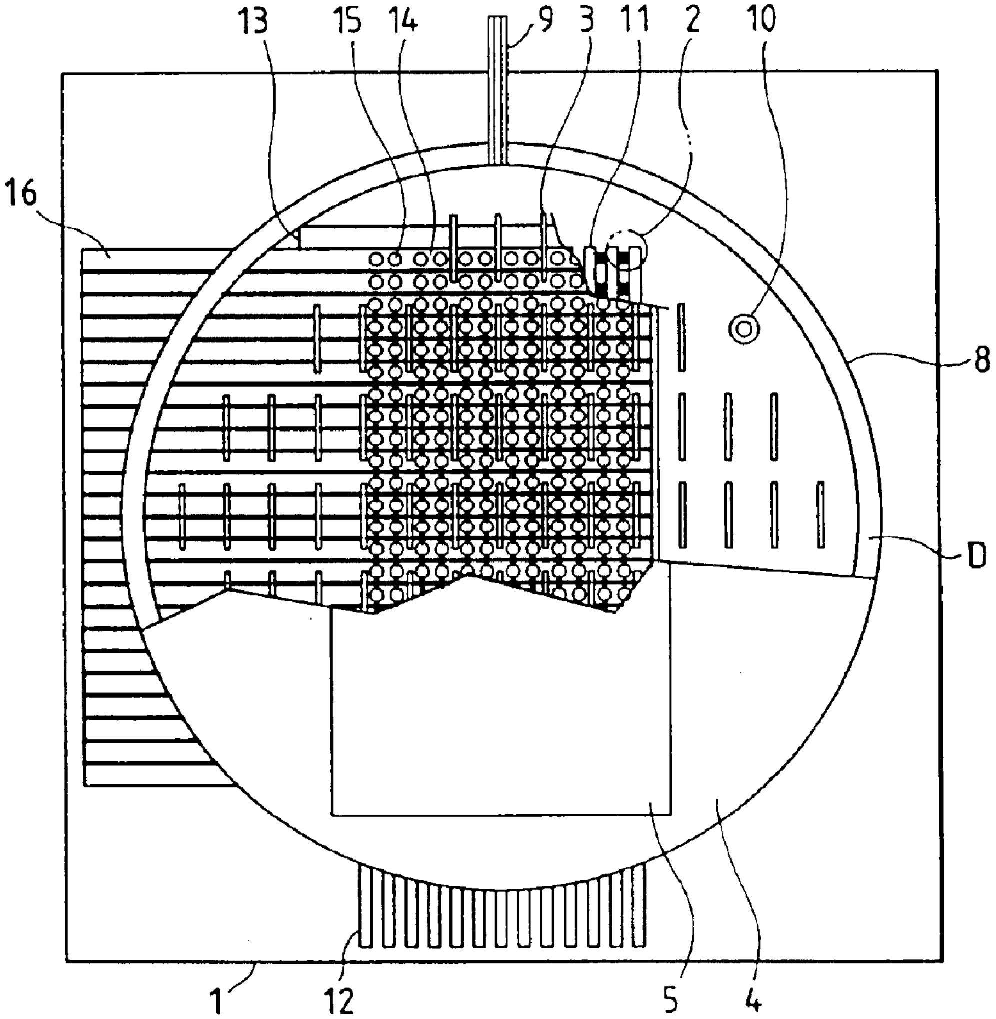

An image-forming apparatus using a circular outer frame will be described below. FIG. 6 is a plan view showing arrangements of this Example.

In FIG. 6, a base plate 1 as a rear plate was made of soda lime glass and had a size of 200 mm×200 mm. Atmospheric pressure bearing members (spacers) 3 were made of soda lime glass, each had dimensions of 0.8 mm thickness, 6 mm height and 14 mm length, and were vertically provided with intervals of 18 mm in the longitudinal direction and 10 mm in the transverse direction as shown in FIG. 6. A face plate 4 had an outer diameter of 160 mm. A fluorescent substance of green P-22 was coated on the face plate 4 to form a fluorescent film 5. An outer frame 8 was made of soda lime glass and had an outer diameter of 160 mm and an inner diameter of 150 mm. The remaining components denoted by the same reference numerals as those in FIG. 2 denote identical members. Also, an image-forming apparatus of this Example had a section similar as shown in FIG. 3. The other structure and dimensions were the same as in Example 1 except that wirings 11 and grid electrodes 14 had different lengths and the number of surface conduction electron-emitting devices arrayed was different. An image-forming apparatus of this Example was manufactured as with Example 1 in points of the manufacture method, the evacuation method, the pressure to be reached after evacuation, the processes of forming, heating/degassing and getter flashing, as well as sealing-off of the vent tube. Then, grid contacts 16 and contact electrodes 12 were connected to the exterior driving circuit shown in FIG. 20 through flat cables (not shown). A video signal was supplied to the surface conduction electron-emitting devices and the grid electrodes 14 and, simultaneously, a voltage of 5 kV was applied to the fluorescent film 5 and the metal back 6 from a high-pressure power supply (not shown) for displaying an image. As a result, a good image was stably displayed in the image-forming apparatus of this Example.

Comparative Example 4

An image-forming apparatus was manufactured in exactly the same structure and manner as the image-forming apparatus of Example 4 except that the vent tube 9 was attached to a position D shown in FIG. 6. As a result of evacuating a constructed envelope in the same manner as in Example 4, the time taken to evacuate the envelope to the same pressure of $1\times10^{-6}$ torr was about 1.6 times the time taken in Example 4. Additionally, as a result of evacuating the envelope of the image-forming apparatus of Example 4 for the same time as in this Comparative Example, the pressure in the envelope just before sealing off the vent tube was about a 2/5 of the pressure achieved in the envelope of the image-forming apparatus of this Comparative Example. Thus, the envelope of Example 4 was able to reach a lower final pressure and reduce the amount of residual gas.

EXAMPLE 5

An image-forming apparatus using a number of FM electron-emitting devices, shown in FIG. 17, as electron-emitting devices will be described below.

FIG. 17 shows a structure of an FM electron-emitting devices. In FIG. 17, denoted by 40 is a negative electrode, 41 is a positive electrode, 44 is an electron-emitting region having sharpened edges to emit electrons, and 43 is an insulating layer. In this structure, when a voltage is applied to between the positive electrode 41 and the negative electrode 40, an electric field is concentrated in the electron-emitting region 44, causing the electron-emitting region 44 to emit electrons. In the FM electron-emitting device of this Example, the negative electrode 40 and the positive electrode 41 were each formed of an Au film having a thickness of 1 μm, and the edge angle of the electron-emitting region 44 was set to 45 degrees. Electron-emitting devices corresponding to one pixel had a total of 100 electron-emitting regions 44, and the insulating layer 43 was formed of a $SiO_2$ film having a thickness of 1 μm. The Au and $SiO_2$ films were deposited by sputtering and patterned by the photolithography (including etching, lift-off, etc.). The FM electron-emitting devices was substituted for the surface conduction electron-emitting devices of Example 1, and the positive electrodes 41 and the negative electrodes 40 were connected to the wirings 11. The other structure and dimensions were the same as in Example 1.

Except the electron-emitting devices, an image-forming apparatus of this Example was manufactured as with Example 1 in points of the manufacture method, the evacuation method, the pressure to be reached after evacuation, the processes of forming, heating/degassing and getter flashing, as well as sealing-off of the vent tube. Then, the grid contacts 16 and the contact electrodes 12 were connected to an exterior driving circuit (not shown) through flat cables (not shown). A video signal was supplied to the surface conduction electron-emitting devices and the grid electrodes 14 and, simultaneously, a voltage of 5 kV was applied to the fluorescent film 5 and the metal back 6 from a high-pressure power supply (not shown) for displaying an image. As a result, a good image was also displayed in this Example.

Comparative Example 5

An image-forming apparatus was manufactured in exactly the same structure as the image-forming apparatus of Example 5 except that, as with Comparative Example 1, the vent tube 9 was attached to a side of the outer frame 8 which was positioned perpendicularly to the side of the outer frame 8 to which the vent tube 9 was attached as shown in FIG. 2. As a result of evacuating a constructed envelope in the same manner as in Example 5, the time taken to evacuate the envelope to the same pressure of $1\times10^{-6}$ torr was about 1.5 times the time taken in Example 5. Additionally, as a result of evacuating the envelope of the image-forming apparatus of Example 5 for the same time as in this Comparative Example, the pressure in the envelope just before sealing off the vent tube was about a half the pressure achieved in the envelope of the image-forming apparatus of this Comparative Example. Thus, the envelope of Example 5 was able to reach a lower final pressure and reduce the amount of residual gas.

EXAMPLE 6

An image-forming apparatus shown in FIG. 7 will be described below.

Figure 7:
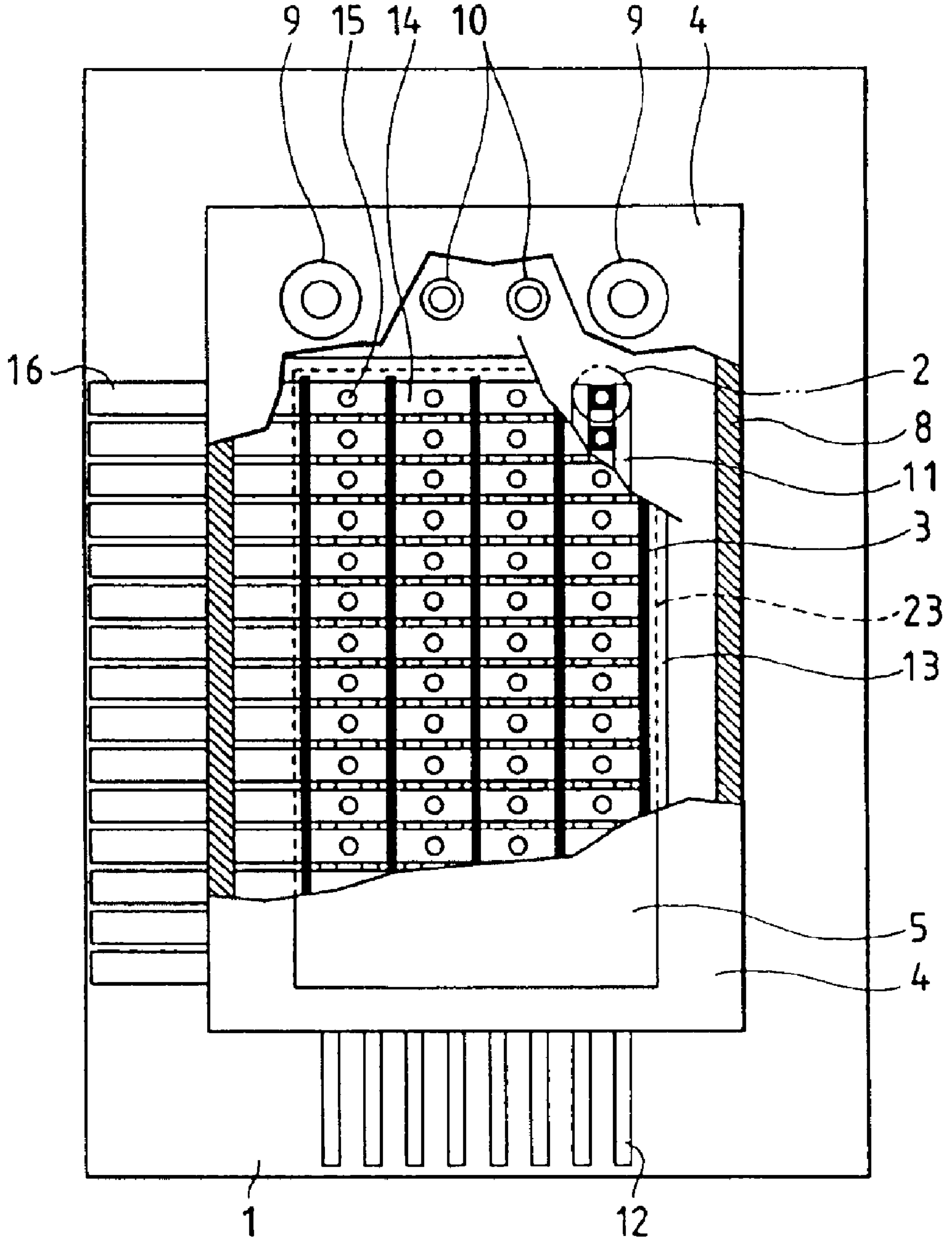

FIG. 7 schematically shows an image-forming apparatus of this Example.

In FIG. 7, denoted by 3 is an atmospheric pressure bearing member (spacer) made of soda lime glass.

23 is an atmospheric pressure bearing structure area delimited by linear lines interconnecting four corners of a group of atmospheric pressure bearing members 3.

9 is a vent tube provided in number two through which activating gas is introduced and air is evacuated. The vent tubes are formed of soda lime glass tubes having the same dimensions and having end faces polished.

4 is a face plate provided with holes for attachment of the vent tubes 9.

Other components are identical to those in Example 1 shown in FIG. 2 and, therefore, are denoted by the same reference numerals.

The image-forming apparatus of this Example was manufactured as follows.

A grid and a fluorescent film were formed on one surface of the face plate 4 by using the same process as in Example 1.

Then, on the surface of the face plate 4 having the grid and the fluorescent film formed thereon, the atmospheric pressure bearing members 3 were mounted by using frit glass, LS-7107 by Nippon Electric Glass Co., Ltd., as an adhesive.

At this time, the atmospheric pressure bearing members 3 were vertically provided on the grid of the face plate 4 with uniform intervals.

After that, the face plate 4 was baked at 440° C. for 20 minutes for fusing the atmospheric pressure bearing members to the face plate 4.

Next, surface conduction electron-emitting devices 2, device electrodes, conductive film wirings and so on were formed on the base plate 1 by the same process as in Example 1, thereby fabricating a ladder type electron source.

Subsequently, on the surface of the base plate 1 having the ladder type electron source formed thereon, an outer frame 8 and ring-shaped getters 10 were mounted by using frit glass, LS-3081 by Nippon Electric Glass Co., Ltd., as an adhesive.

At this time, the outer frame 8 was arranged so as to include the whole atmospheric pressure bearing structure area 23.

The ring-shaped getters 10 were disposed inside the outer frame 8, but outside an area where the electron-emitting devices 2 were formed.

Then, the face plate 4 having the atmospheric pressure bearing members 3 mounted thereon was bonded to the outer frame 8 mounted on the base plate 1 by using the frit glass LS-3081 as an adhesive.

The vent tubes 9 were then vertically fixed onto the face plate 4 by using the frit glass LS-3081 as an adhesive.

When attaching the vent tubes 9, the frit glass was applied to one polished end face of each vent tube 9, and the end face coated with the frit glass was vertically inserted to one of the holes bored in the face plate 4 for attachment of the bent tubes 9.

At this time, to prevent the vent tube 9 from tilting or shifting, the vent tube 9 was held in place by using a jig until it was completely fused by the frit glass.

After that, the assembly was baked at 410° C. for 20 minutes for fusing the components together by the frit glass, thereby constructing a vacuum envelope consisted of the base plate 1, the face plate 4, the outer frame 8, and the vent tubes 9.

Next, the vent tubes 9 on the envelope was connected to a vacuum system. After evacuating an inner space of the envelope, the forming process was carried out as with Example 1 to form electron-emitting regions.

The electron-emitting regions formed by the forming process were then subjected to the activation process.

In the activation process, acetone was introduced as activating gas into the envelope through the vent tubes 9, and a vacuum atmosphere on the order of $1\times10^{-5}$ torr, containing acetone, was created in the envelope. Thereafter, a predetermined pulse was repeatedly applied to the electron-emitting regions 34 from an external driving circuit (not shown) connected to contact electrodes 12 and grid contacts 16.

At this time, the applied pulse was set to a pulse having a crest value of 13 V and frequency of about 100 Hz.

The activation process was finished at the time the emission current Ie was saturated.

As a result of the above activation process, the device current If and the emission current Ie were remarkably changed.

Next, the electron-emitting devices after the activation process were subjected to the stabilization process.

In the stabilization process, the whole envelope was heated to 200° C. while the inner space of the envelop was evacuated by a sorption pump connected to the vent tubes 9.

The stabilization process was finished at the time the pressure in the envelope reached a vacuum level $1\times10^{-6}$ torr or higher.

Finally, the getters were flashed and the vent tubes were sealed off as with Example 1, thereby manufacturing an image-forming apparatus.

Then, the grid contacts 16 and the contact electrodes 12 were connected to an exterior driving circuit (not shown) through flat cables (not shown). A video signal was supplied to the surface conduction electron-emitting devices and the grid electrodes 14 and, simultaneously, a voltage of 5 kV was applied to the fluorescent film 5 and the metal back 6 from a high-pressure power supply (not shown) for displaying an image.

In the image-forming apparatus of this Example 1, the time taken to evacuate the envelope to the same pressure of $1\times10^{-6}$ torr was shortened and a higher vacuum level was created by the evacuation for the same time.

It was also confirmed that, when introducing the activating gas, a partial pressure of the activating gas was made uniform within the envelope in a short time, and variations in electrical characteristics of the electron-emitting devices after the activation process were very small.

EXAMPLE 7

An image-forming apparatus using a number of atmospheric pressure bearing members (spacers) 3 arranged in a matrix pattern will be described below with reference to FIG. 8.

Figure 8:
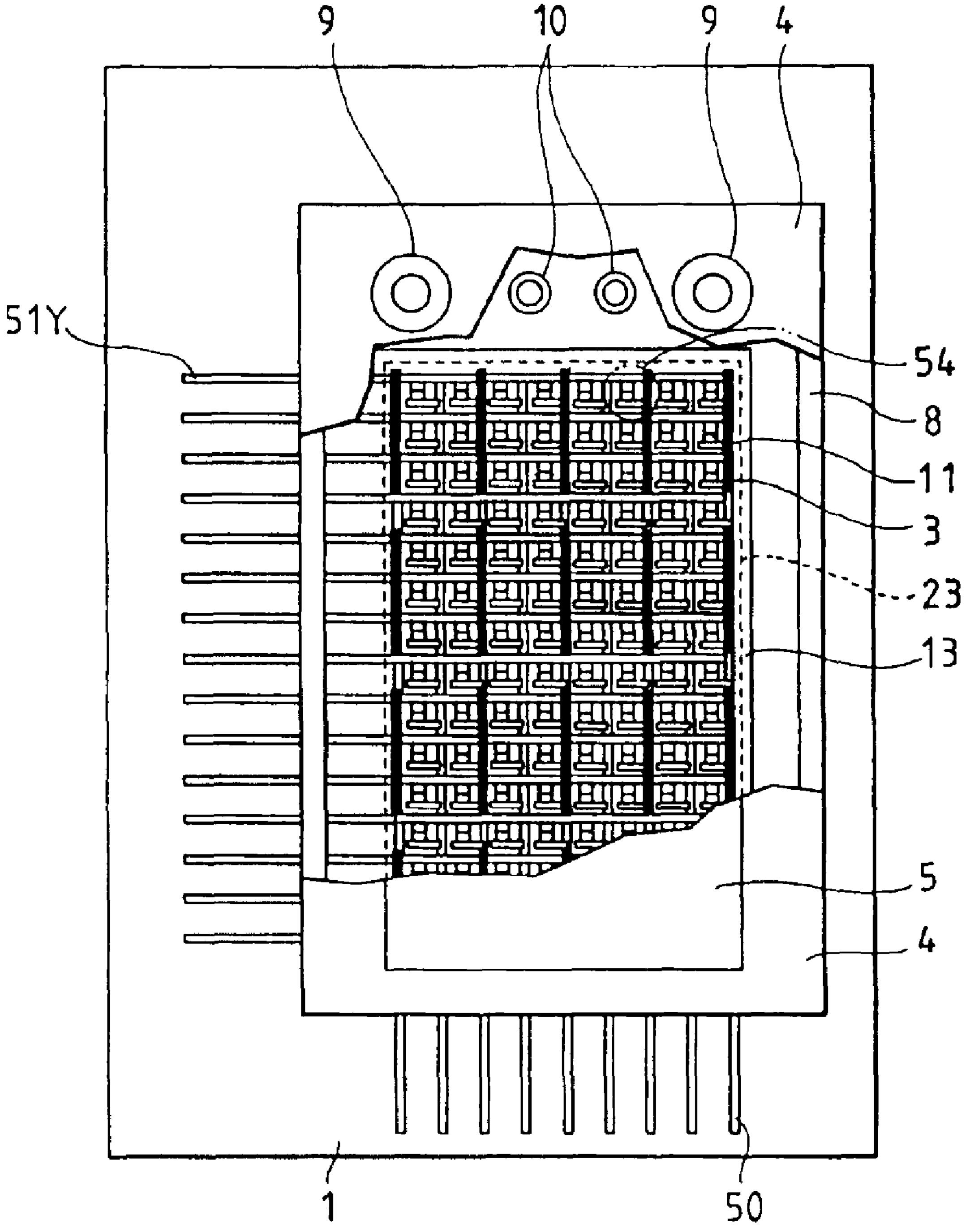

FIG. 8 schematically shows an image-forming apparatus of this Example. In this Example, the atmospheric pressure bearing members 3 were arranged in a matrix pattern.

Surface conduction electron-emitting devices 54 were used as the electron-emitting devices, and X- and Y-directional wirings 50, 51 were provided for driving the surface conduction electron-emitting devices 54. The remaining arrangements are the same as in Example 6 shown in FIG. 7 and, hence, will not be described here.

Since the atmospheric pressure bearing members 3 in this Example were shorter than those ones 3 in Example 6 of FIG. 7, variations in dimensions caused in the process of cutting and polishing the atmospheric pressure bearing members 3 into desired shaped were kept small. As a result, the yield of the atmospheric pressure bearing members 3 was increased and the production cost thereof was reduced.

Further, since the atmospheric pressure bearing members 3 were arranged with intervals as shown in FIG. 8, there found no reduction in conductance when activating gas was introduced into the envelope and when air was evacuated therefrom. As a result, the activation process was effected uniformly and the desired vacuum level was reached in a shorter time.

The image-forming apparatus of this Example was manufactured in the same structure and manner as in Example 6 except the size and arrangement of the atmospheric pressure bearing members. As a result of displaying an image in a like manner to Example 6, a good image was displayed.

EXAMPLE 8

An image-forming apparatus using a number of atmospheric pressure bearing members 3 in the form of flat plates arranged in a zigzag pattern with respect to one longitudinal side of an outer frame will be described below with reference to FIG. 9.

Figure 9:
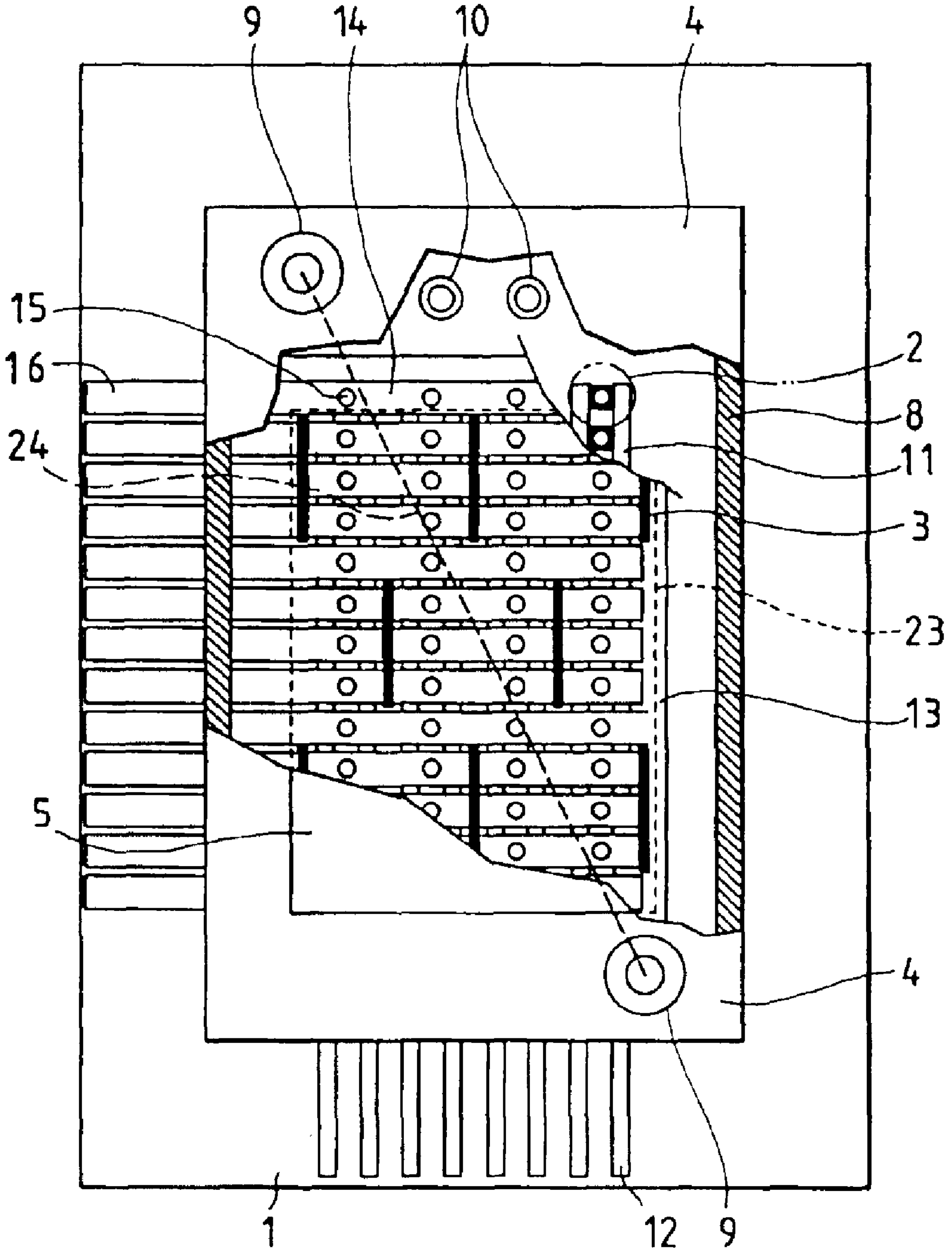

FIG. 9 schematically shows an image-forming apparatus of this Example.

The atmospheric pressure bearing members 3 were arranged within an envelope endurable against the atmospheric pressure, as shown FIG. 9, in a zigzag pattern with respect to one longitudinal side of the outer frame while keeping intervals therebetween. The rectangular envelope is provided with two vent tubes 9 disposed in opposite corners of the rectangle, one being used for introducing an activating gas and the other for evacuating the inside of the envelope. Therefore, when activating gas was introduced into the envelope, a partial pressure of the activating gas was made more uniform within the envelope.

Also, there found no reduction in conductance when air in the envelope was evacuated therefrom. As a result, the uniform activation of the electron-emitting devices and the desired vacuum level were achieved in a shorter time.

Furthermore, a straight line connecting a pair of vent tubes 9 are indicated by 24. The atmospheric pressure bearing members 3 were not arranged across the straight line 24. The remaining arrangements are the same as in Example 6 shown in FIG. 7.

The image-forming apparatus of this Example was manufactured in the same manner as in Example 6 except the arrangements of the atmospheric pressure bearing members 3 and the vent tubes 9. A good image was also displayed in this Example.

EXAMPLE 9

An image-forming apparatus using a number of atmospheric pressure bearing members 3 arranged in a matrix pattern and two vent tubes will be described below with reference to FIG. 10.

Figure 10:
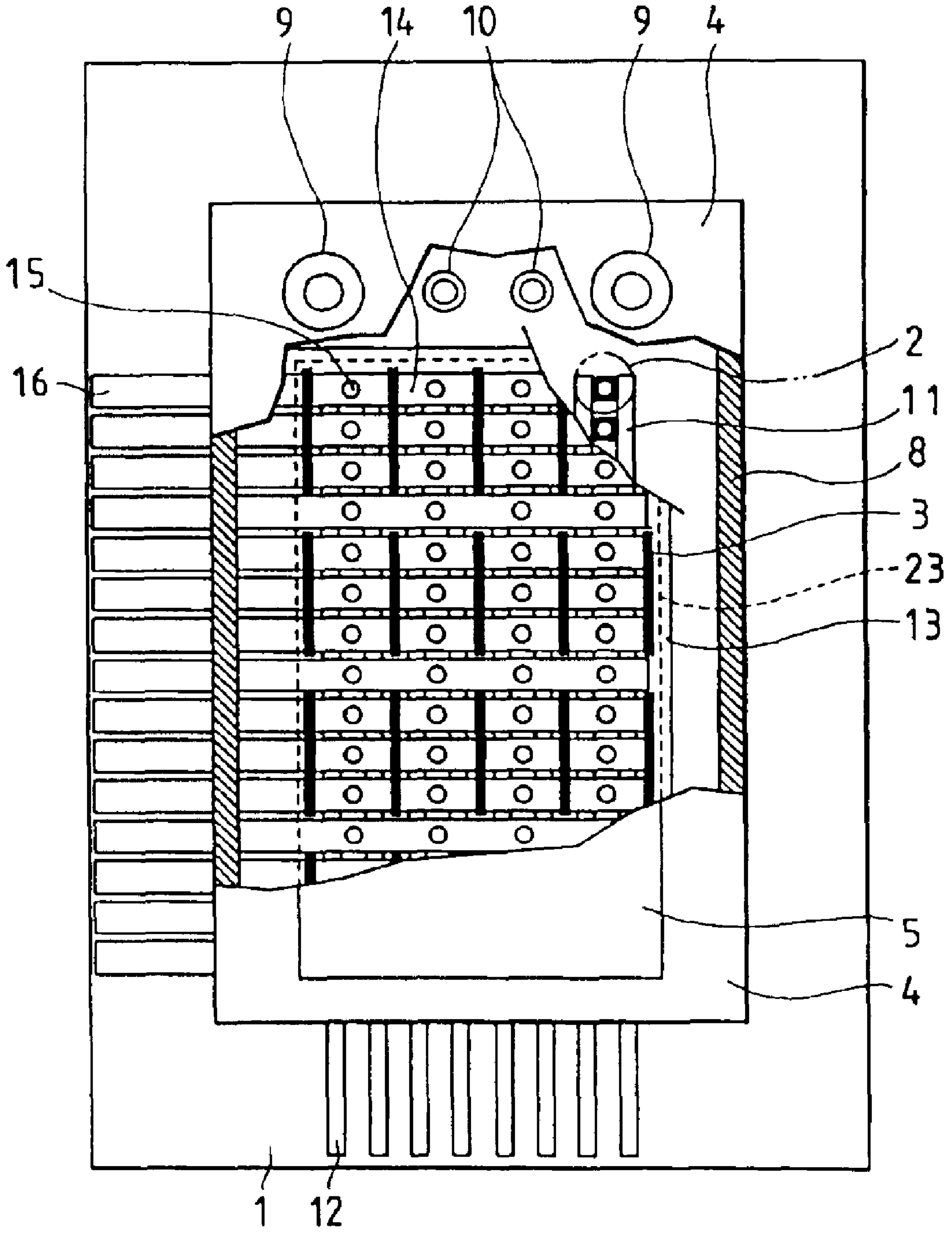

FIG. 10 schematically shows an image-forming apparatus of this Example. In this Example, the atmospheric pressure bearing members 3 were arranged in a matrix pattern. The atmospheric pressure bearing members 3 were the same as those used in Example 7.

The image-forming apparatus of this Example was manufactured in the same structure and manner as in Example 6 except the number and arrangement of the atmospheric pressure bearing members 3. A good image was also displayed as with Example 6.

EXAMPLE 10

An image-forming apparatus using a number of atmospheric pressure bearing members 3 in the form of flat plates, which are arranged in a zigzag pattern with respect to one longitudinal side of an outer frame, and four vent tubes will be described below with reference to FIG. 11.

Figure 11:
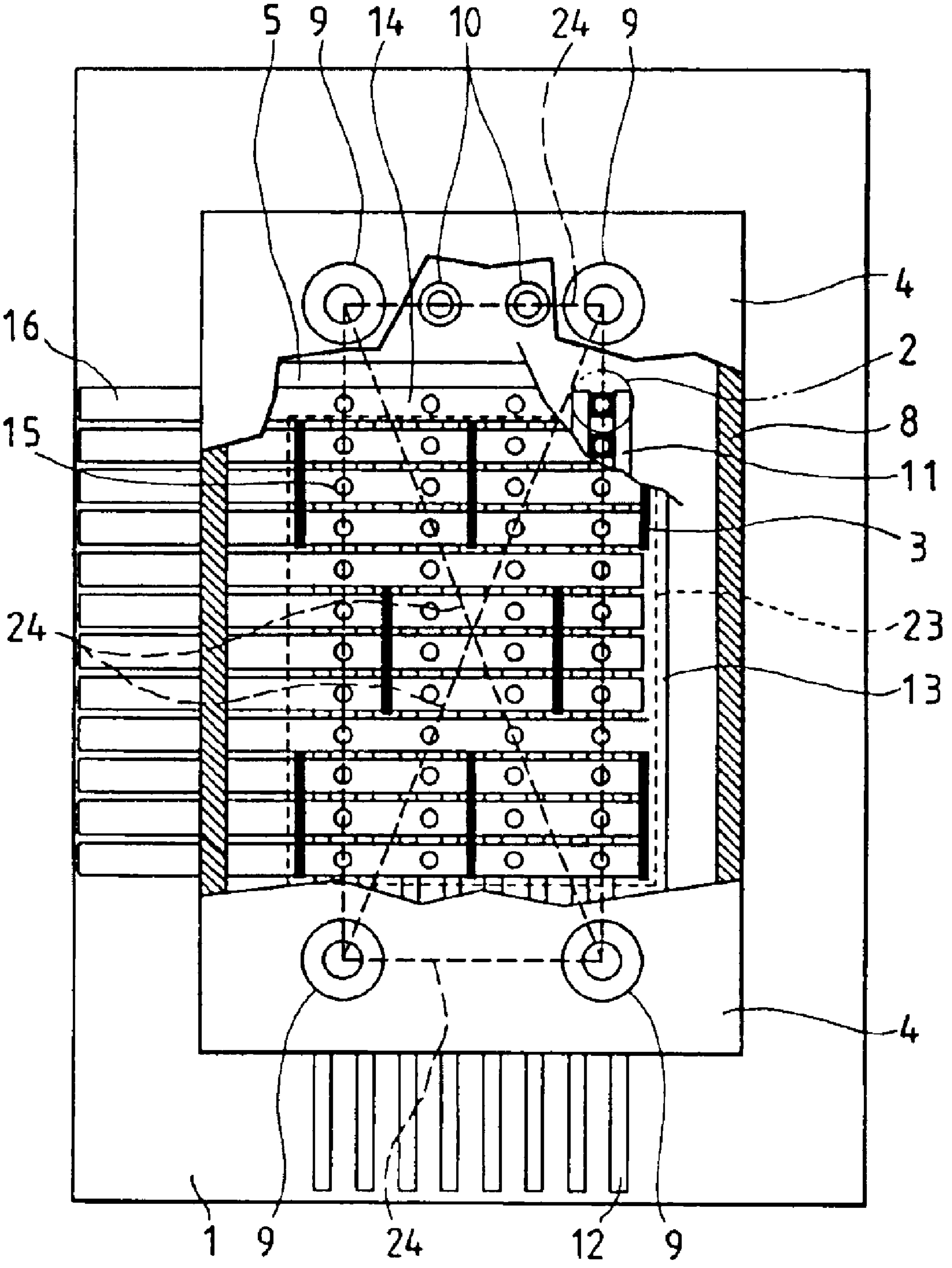

FIG. 11 schematically shows an image-forming apparatus of this Example. The image-forming apparatus of this Example had the same structure as Example 8 except that four vent tubes were provided.

The atmospheric pressure bearing members 3 were not arranged across any straight lines 24 connecting all the vent tubes 9. With the image-forming apparatus of this Example, very high evacuation efficiency was achieved and a good image was also displayed.

While the vent tubes 9 were attached to the face plate, the attachment position of the vent tubes 9 is not limited to this Example. The vent tubes may be attached to the rear plate, or to both the face plate and the rear plate in a distributed manner.

Further, the vent tubes may serve as activation gas introducing tubes and evacuation tubes.

EXAMPLE 11

Figure 12:
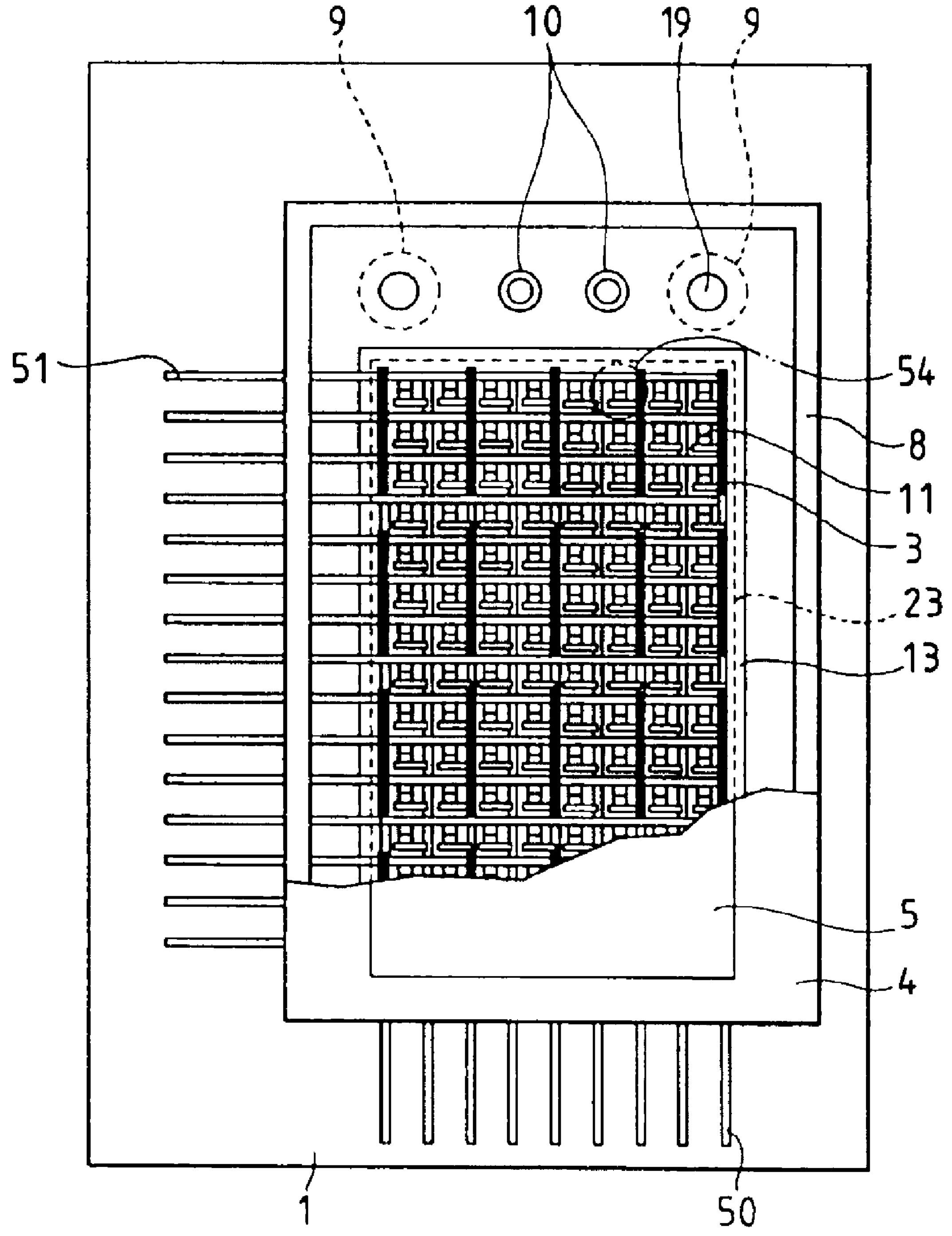

An image-forming apparatus having vent tubes attached to a rear plate will be described below with reference to FIG. 12. FIG. 12 schematically shows an image-forming apparatus of this Example. In this Example, as shown in FIG. 12, the vent tubes 9 were attached to the rear plate 1. Reference numeral 19 in FIG. 12 shows a hole defined in the rear plate. The image-forming apparatus of this Example was manufactured in the same structure and manner as in Example 7 except that the vent tubes 9 were attached to the rear plate 1. A good image was also displayed in this Example.

What is claimed is:

1. An image forming apparatus comprising:

a first plate including electron-emitting devices, said electron-emitting devices being formed in an approximate rectangular region;

a second plate disposed to face said first plate;

a plurality of spacers disposed between said first plate and said second plate, each of said spacers having a longitudinal axis extending from one side of said rectangle region to an opposite side of said rectangle region, said spacers being disposed so that said longitudinal axes are substantially in parallel with each other;

an outer frame hermetically surrounding a space between said first plate and said second plate, wherein ends of each spacer in a longitudinal direction are positioned within an area between said rectangle region and said outer frame; and at least one getter disposed between said first plate and said second plate, said getter being located in a region interposed between a frame side of said outer frame that is positioned across imaginary extensions of the longitudinal axes of said spacers and said ends facing said frame side of said spacers and being interposed between imaginary extensions of the longitudinal axes of the two outermost spacers.

2. The image forming apparatus according to claim 1, wherein said getter is a ring-shaped getter.

3. The image forming apparatus according to claim 1, wherein said electron-emitting devices are field emission type electron-emitting devices.

4. The image-forming apparatus according to claim 1, wherein said electron-emitting devices are surface conduction electron-emitting devices.

5. The image-forming apparatus to claim 1, wherein said getter is disposed on said first plate.

* * * * *

UNITED STATES PATENT AND TRADEMARK OFFICE

CERTIFICATE OF CORRECTION

PATENT NO. : 6,867,537 B2
DATED : March 15, 2005
INVENTOR(S) : Yasue Sato et al.

It is certified that error appears in the above-identified patent and that said Letters Patent is hereby corrected as shown below:

Title page,
Item [*] Notice, insert:
-- This patent issued on a continued prosecution application filed under 37 CFR 1.53(d), and is subject to the twenty year patent term provisions of 35 U.S.C. 154(a)(2) --.

Signed and Sealed this

Fourth Day of April, 2006

JON W. DUDAS
*Director of the United States Patent and Trademark Office*